US008275735B2

(12) United States Patent
Fujimaki et al.

(10) Patent No.: US 8,275,735 B2
(45) Date of Patent: Sep. 25, 2012

(54) DIAGNOSTIC SYSTEM

(75) Inventors: Ryohei Fujimaki, Tokyo (JP); Hidenori Tsukahara, Tokyo (JP); Akinori Satou, Tokyo (JP)

(73) Assignee: NEC Corporation, Tokyo (JP)

( * ) Notice: Subject to any disclaimer, the term of this patent is extended or adjusted under 35 U.S.C. 154(b) by 478 days.

(21) Appl. No.: 12/593,491

(22) PCT Filed: Mar. 13, 2008

(86) PCT No.: PCT/JP2008/054667
§ 371 (c)(1),
(2), (4) Date: Sep. 28, 2009

(87) PCT Pub. No.: WO2008/120552
PCT Pub. Date: Oct. 9, 2008

(65) Prior Publication Data
US 2010/0100521 A1    Apr. 22, 2010

(30) Foreign Application Priority Data
Mar. 29, 2007    (JP) .................................. 2007-086898

(51) Int. Cl.
G06F 17/00  (2006.01)
G06N 5/02   (2006.01)

(52) U.S. Cl. ............... 706/47; 706/45; 706/46; 706/52; 706/62

(58) Field of Classification Search ........................ None
See application file for complete search history.

(56) References Cited

U.S. PATENT DOCUMENTS

| 5,949,676 | A | 9/1999 | Elsley | |
|---|---|---|---|---|
| 7,100,084 | B2* | 8/2006 | Unkle et al. | 714/26 |
| 7,315,825 | B2* | 1/2008 | Rosenfeld et al. | 705/2 |
| 7,337,086 | B2* | 2/2008 | Guralnik et al. | 702/113 |
| 8,001,527 | B1* | 8/2011 | Qureshi et al. | 717/120 |
| 2005/0240545 | A1 | 10/2005 | Schachtely et al. | |
| 2007/0088982 | A1* | 4/2007 | Guralnik et al. | 714/26 |
| 2007/0220330 | A1* | 9/2007 | Nauerz et al. | 714/26 |
| 2008/0015450 | A1* | 1/2008 | Ye et al. | 600/481 |

FOREIGN PATENT DOCUMENTS

| JP | 5-307484 A | 11/1993 |
|---|---|---|
| JP | 8-030152 A | 2/1996 |

(Continued)

OTHER PUBLICATIONS

International Search Report for PCT/JP2008/054667 mailed May 13, 2008.
J. Takeuchi et al., "A Unifying Framework for Detecting Outliers and Change Points from Time Series", IEEE Transactions on Knowledge and Data Engineering, vol. 18, No. 4, pp. 482-492, Apr. 2006.
Supplementary European Search Report for EP 08 73 8655 dated Dec. 9, 2010.

(Continued)

Primary Examiner — Omar Fernandez Rivas

(57) ABSTRACT

The present invention provides a diagnostic system that diagnoses a diagnostic object by applying a diagnostic rule to data measured on the diagnostic object wherein an object of the present invention is to allow the diagnostic rule to be updated based on a variety of diagnostic case data. Each of multiple diagnostic devices 101 makes a diagnosis by applying a diagnostic rule to diagnostic object data measured on a diagnostic object 104 and sends diagnostic case data, which includes diagnostic object data and its diagnostic result, to a diagnostic rule generation device 102 via a network 103. The diagnostic rule generation device 102 generates a diagnostic rule based on the diagnostic case data received from the multiple diagnostic devices 101 and sends the generated diagnostic rule to the diagnostic devices 101 via the network 103. The diagnostic devices 101 update a diagnostic rule in their devices with the diagnostic rule received from the diagnostic rule generation device 102.

18 Claims, 22 Drawing Sheets

FOREIGN PATENT DOCUMENTS

| | | |
|---|---|---|
| JP | 11-338729 A | 12/1999 |
| JP | 2002169611 A | 6/2002 |
| JP | 2005345154 A | 12/2005 |
| JP | 2007018530 A | 1/2007 |

* cited by examiner

FIG. 4

| DEVICE NUMBER | DATA NUMBER | DIAGNOSTIC OBJECT DATA | DIAGNOSTIC RESULT |

DIAGNOSTIC SYSTEM

The present application is the National Phase of PCT/JP2008/054667, filed Mar. 13, 2008, which claims priority based on Japanese Patent Application 2007-086898 (filed on Mar. 29, 2007) the content of which is hereby incorporated in its entirety by reference thereto into this application.

TECHNICAL FIELD

The present invention relates to a diagnostic system that senses a fault generated in a diagnostic object, and estimates the cause of the fault, based on data measured on the diagnostic object.

BACKGROUND ART

The operation of various systems, for example, various devices such as industrial machines, plant facilities, and network systems, requires speedy sensing of faults and as necessary an investigation of the cause. To meet this need, many diagnostic systems are conventionally proposed and practically used for sensing faults and estimating the cause of faults, based on the data measured on the parts of diagnostic objects, with various devices and systems as a diagnostic object.

For example, Patent Document 1 proposes a diagnostic system that diagnoses industrial rotary machines. The diagnostic system makes a fuzzy-pattern-matching based fault diagnosis using multiple fuzzy symptoms, obtained by making fuzzy the vibrations detected from a diagnostic object and the symptoms derived from the sound signal, as well as a fuzzy diagnostic rule that diagnoses the faults of the diagnostic object. If the fuzzy diagnostic rule does not match the state of a diagnostic object, knowledge-network-based learning is performed to create a new fuzzy diagnostic rule that receives the fuzzy symptoms and outputs the state of the diagnostic object.

Patent Document 2 proposes a diagnostic system designed for diagnostic objects that are plant facilities such as factories or power plants. This diagnostic system uses a diagnostic rule in the IF-THEN format to diagnose the condition of the facilities based on data measured on a diagnostic object. When a user enters an empirical case composed of the abnormal symptom of a diagnostic object and its degree, the occurrence frequency, and the cause, the diagnostic system generates probabilistic empirical knowledge from the empirical case and creates a new diagnostic rule from this empirical knowledge.
Patent Document 1:
Japanese Patent Kokai Publication No. JP2002-169611A
Patent Document 2:
Japanese Patent Kokai Publication No. JP-A-5-307484
Patent Document 3:
Japanese Patent Kokai Publication No. JP2007-018530A
Patent Document 4:
Japanese Patent Kokai Publication No. 2005-345154
Non-Patent Document 1:
J. Takeuchi and K. Yamanishi. A unifying framework that detects outliers and change points from time series. IEEE Transactions on Knowledge and Data Engineering, 18(4): 482-492,2006

SUMMARY

The disclosed contents of Patent Documents 1-4 and Non-Patent Document 1 given above are hereby incorporated by reference thereto into this application. The following gives an analysis of the technology by the present invention.

The performance of a diagnostic system that diagnoses a diagnostic object using a diagnostic rule depends largely on the perfectness of the diagnostic rule. If the number of diagnostic rules is insufficient or the diagnostic rule does not match with the status of a diagnostic object, the diagnosis cannot be made correctly. However, in the conventional systems, it is not easy to update the diagnostic rule.

One of the reasons is that updating a diagnostic rule for sensing abnormal conditions and estimating their causes require a number of various cases but that the probability with which an abnormal condition occurs in a diagnostic object, which has been reliably constructed, becomes lower and therefore it becomes more difficult to find cases related to an abnormal condition of the diagnostic object. Another reason is that, when an attempt is made to detect the indication of an abnormal condition during normal operation time as disclosed in Patent Document 4, the indication of an abnormal condition cannot be detected correctly if data collected during normal operation time is biased because of the usage mode of the diagnostic object or the environment in which the diagnostic object is placed.

It is an object of the present invention to provide a diagnostic system that diagnoses a diagnostic object by applying a diagnostic rule to data measured on the diagnostic object wherein the diagnostic rule is updated to a better diagnostic rule based on various types of case data.

Means to Solve the Problems

In a first aspect of the present invention, there is provided a diagnostic system that diagnoses a diagnostic object by applying a diagnostic rule to diagnostic object data measured on the diagnostic object. The diagnostic system is characterized in that diagnostic case data, which includes diagnostic object data measured on a diagnostic object and a diagnostic result thereof, is collected from a plurality of diagnostic objects and, based on the collected diagnostic case data, a new diagnostic rule that updates the diagnostic rule is generated. More specifically, the diagnostic system has the configuration described below.

A first diagnostic system of the present invention is a system where a plurality of diagnostic devices, each of which diagnoses a diagnostic object, and a diagnostic rule generation device, which generates a diagnostic rule used for a diagnosis, are communicably connected. The diagnostic device comprises: a diagnostic rule storage unit that stores a diagnostic rule; a diagnostic unit that diagnoses a diagnostic object by applying the diagnostic rule to diagnostic object data measured on the diagnostic object and outputs a diagnostic result thereof from an output device; a diagnostic case data sending unit that sends diagnostic case data, which includes the diagnostic object data and the diagnostic result, to the diagnostic rule generation device; and a diagnostic rule update unit that updates the diagnostic rule storage unit with a diagnostic rule received from the diagnostic rule generation device. The diagnostic rule generation device comprises a diagnostic rule generation unit that generates a diagnostic rule based on the diagnostic case data received from the plurality of diagnostic devices; and a diagnostic rule sending unit that sends the diagnostic rule, generated by the diagnostic rule generation unit, to the diagnostic devices.

A second diagnostic system of the present invention is a diagnostic system as defined by the first diagnostic system wherein the diagnostic device further comprises: an abnormal-time estimation unit that detects if the diagnostic object data is data at a time series change point or an outlier of a data distribution. The diagnostic case data sending unit sends the diagnostic case data in a fixed period, which includes a point in time at which a time series change point or an outlier of a data distribution was detected by the abnormal-time estimation unit, to the diagnostic rule generation device.

A third diagnostic system of the present invention is a system where a plurality of diagnostic devices, each of which diagnoses a diagnostic object, and a diagnostic rule generation device, which generates a diagnostic rule used for a diagnosis, are communicably connected. The diagnostic device comprises: a diagnostic rule storage unit that stores a diagnostic rule; a diagnostic unit that diagnoses a diagnostic object by applying the diagnostic rule to diagnostic object data measured on the diagnostic object and outputs a diagnostic result thereof from an output device; a first diagnostic rule generation unit that generates a diagnostic rule based on the diagnostic case data that includes the diagnostic object data and the diagnostic result; a first diagnostic rule sending unit that sends the diagnostic rule, generated by the first diagnostic rule generation unit, to the diagnostic rule generation device; and a diagnostic rule update unit that updates the diagnostic rule storage unit with the diagnostic rule received from the diagnostic rule generation device. The diagnostic rule generation device comprises a second diagnostic rule generation unit that generates a diagnostic rule by integrating a plurality of diagnostic rules received from the plurality of diagnostic devices; and a second diagnostic rule sending unit that sends the diagnostic rule, generated by the second diagnostic rule generation unit, to the diagnostic devices.

A fourth diagnostic system of the present invention is a system where a plurality of first diagnostic devices each of which senses an abnormal condition of a diagnostic object, a second diagnostic device that diagnoses more in detail a state of the diagnostic object in which an abnormal condition was detected by the first diagnostic device, and a diagnostic rule generation device that generates a diagnostic rule used for a diagnosis are communicably connected.

The first diagnostic device comprises a first diagnostic unit that senses an abnormal condition of a diagnostic object based on diagnostic object data measured on the diagnostic object; and detailed diagnosis request unit that sends diagnostic request data, which includes diagnostic object data in a fixed period including a point in time at which an abnormal condition was sensed by the first diagnostic unit, to the second diagnostic device, receives a diagnostic result thereof, and outputs the diagnostic result from the output device.

The second diagnostic device comprises a diagnostic rule storage unit that stores a diagnostic rule; a second diagnostic unit that diagnoses the diagnostic object by applying the diagnostic rule to the diagnostic request data received from the first diagnostic device; a diagnostic result response unit that sends a diagnostic result of the diagnostic request data to the first diagnostic device that is a diagnosis requesting device; a diagnostic case data sending unit that sends diagnostic case data, which includes the diagnostic object data in the diagnostic request data and a diagnostic result thereof, to the diagnostic rule generation device; and a diagnostic rule update unit that updates the diagnostic rule storage unit with the diagnostic rule received from the diagnostic rule generation device.

The diagnostic rule generation device comprises a diagnostic rule generation unit that generates a diagnostic rule based on the diagnostic case data received from the second diagnostic device; and a diagnostic rule sending unit that sends the diagnostic rule, generated by the diagnostic rule generation unit, to the second diagnostic device.

A fifth diagnostic system of the present invention is a system wherein a plurality of first diagnostic devices, each of which senses an abnormal condition of a diagnostic object, are communicably connected to a second diagnostic device that diagnoses more in detail a state of the diagnostic object in which an abnormal condition was detected by the first diagnostic device and, at the same time, generates a diagnostic rule used for a diagnosis.

The first diagnostic device comprises: a first diagnostic unit that senses an abnormal condition of a diagnostic object based on diagnostic object data measured on the diagnostic object; and a detailed diagnosis request unit that sends diagnostic request data, which includes diagnostic object data in a fixed period including a point in time at which an abnormal condition was sensed by the first diagnostic unit, to the second diagnostic device, receives a diagnostic result thereof, and outputs the diagnostic result from an output device.

The second diagnostic device comprises a diagnostic rule storage unit that stores a diagnostic rule; a second diagnostic unit that diagnoses the diagnostic object by applying the diagnostic rule to the diagnostic request data received from the first diagnostic device; a diagnostic result response unit that sends a diagnostic result of the diagnostic request data to the first diagnostic device that is a diagnosis requesting device; a diagnostic rule generation unit that generates a diagnostic rule based on diagnostic case data which includes the diagnostic object data in the diagnostic request data and a diagnostic result thereof; and a diagnostic rule update unit that updates the diagnostic rule storage unit with the diagnostic rule generated by the diagnostic rule generation device.

In a second aspect of the present invention, there is provided a diagnostic method. A first diagnostic method of the present invention is a diagnostic method for use in a diagnostic system in which a plurality of diagnostic devices, each of which diagnoses a diagnostic object, and a diagnostic rule generation device, which generates a diagnostic rule used for a diagnosis, are communicably connected, and the diagnostic method comprises the following steps. The diagnostic method includes: a diagnostic step, performed by a diagnostic unit of the diagnostic device, that diagnoses a diagnostic object by applying a diagnostic rule, stored in a diagnostic rule storage unit, to diagnostic object data measured on the diagnostic object, and that outputs a diagnostic result thereof from an output device.

The diagnostic method includes: a diagnostic case data sending step, performed by a diagnostic case data sending unit of the diagnostic device, that sends diagnostic case data, which includes the diagnostic object data and the diagnostic result, to the diagnostic rule generation device.

The diagnostic method includes: a diagnostic rule update step, performed by a diagnostic rule update unit of the diagnostic device, that updates the diagnostic rule storage unit with a diagnostic rule received from the diagnostic rule generation device.

The diagnostic method includes a diagnostic case data reception step, performed by a diagnostic case data reception unit of the diagnostic rule generation device, that stores the diagnostic case data, received from the plurality of diagnostic devices, in a diagnostic case data storage unit.

The diagnostic method includes a diagnostic rule generation step, performed by a diagnostic rule generation unit of the diagnostic rule generation device, that generates a diagnostic rule based on the diagnostic case data stored in the diagnostic case data storage unit.

The diagnostic method includes a diagnostic rule sending step, performed by a diagnostic rule sending unit of the diagnostic rule generation device, that sends the diagnostic rule, generated by the diagnostic rule generation unit, to the diagnostic devices.

A second diagnostic method of the present invention is a diagnostic method for use in a diagnostic system in which a plurality of diagnostic devices, each of which diagnoses a diagnostic object, and a diagnostic rule generation device, which generates a diagnostic rule used for a diagnosis, are communicably connected, and the diagnostic method comprises: a diagnostic step, performed by a diagnostic unit of the diagnostic device, that diagnoses a diagnostic object by applying a diagnostic rule, stored in a diagnostic rule storage unit, to diagnostic object data measured on the diagnostic object, and that outputs a diagnostic result thereof from the output device; an abnormal-time estimation step, performed by an abnormal-time estimation unit of the diagnostic device, that detects if the diagnostic object data is data at a time series change point or an outlier of a data distribution; a diagnostic case data sending step, performed by a diagnostic case data sending unit of the diagnostic device, that sends the diagnostic case data, which includes the diagnostic object data in a fixed period including a point in time at which a time series change point or an outlier of a data distribution was detected by the abnormal-time estimation unit and a diagnostic result thereof, to the diagnostic rule generation device; a diagnostic rule update step, performed by a diagnostic rule update unit of the diagnostic device, that updates the diagnostic rule storage unit with a diagnostic rule received from the diagnostic rule generation device; a diagnostic case data reception step, performed by a diagnostic case data reception unit of the diagnostic rule generation device, that stores the diagnostic case data, received from the plurality of diagnostic devices, in a diagnostic case data storage unit; a diagnostic rule generation step, performed by a diagnostic rule generation unit of the diagnostic rule generation device, that generates a diagnostic rule based on the diagnostic case data stored in the diagnostic case data storage unit; and a diagnostic rule sending step, performed by a diagnostic rule sending unit of the diagnostic rule generation device, that sends the diagnostic rule, generated by the diagnostic rule generation unit, to the diagnostic devices.

A third diagnostic method of the present invention is a diagnostic method for use in a diagnostic system in which a plurality of diagnostic devices, each of which diagnoses a diagnostic object, and a diagnostic rule generation device, which generates a diagnostic rule used for a diagnosis, are communicably connected, and the diagnostic method comprises: a diagnostic step, performed by a diagnostic unit of the diagnostic device, that diagnoses a diagnostic object by applying a diagnostic rule, stored in a first diagnostic rule storage unit, to diagnostic object data measured on the diagnostic object, and that outputs a diagnostic result thereof from the output device; a diagnostic rule generation step, performed by a diagnostic rule generation unit of the diagnostic device, that generates a diagnostic rule based on diagnostic case data which includes the diagnostic object data and the diagnostic result; a diagnostic rule sending step, performed by a diagnostic rule sending unit of the diagnostic device, that sends the diagnostic rule, generated by the diagnostic rule generation unit, to the diagnostic rule generation device; a diagnostic rule update step, performed by a diagnostic rule update unit of the diagnostic device, that updates the diagnostic rule storage unit with the diagnostic rule received from the diagnostic rule generation device; a diagnostic rule reception step, performed by a diagnostic rule reception unit of the diagnostic rule generation device, that stores the diagnostic rule, received from the plurality of diagnostic devices, in a second diagnostic rule storage unit; a diagnostic rule generation step, performed by a diagnostic rule generation unit of the diagnostic rule generation device, that generates an integrated diagnostic rule from the plurality of diagnostic rules stored in the second diagnostic rule storage unit; and a diagnostic rule sending step, performed by a diagnostic rule sending unit of the diagnostic rule generation device, that sends the diagnostic rule, generated by the diagnostic rule generation unit, to the diagnostic devices.

A fourth diagnostic method of the present invention is a diagnostic method for use in a diagnostic system in which a plurality of first diagnostic devices each of which senses an abnormal condition of a diagnostic object, a second diagnostic device that diagnoses more in detail a state of the diagnostic object in which an abnormal condition was detected by the first diagnostic device, and a diagnostic rule generation device that generates a diagnostic rule used for a diagnosis are communicably connected. The diagnostic method comprises: a diagnostic step, performed by a diagnostic unit of the first diagnostic device, that senses an abnormal condition of a diagnostic object based on diagnostic object data measured on the diagnostic object; a detailed diagnosis request step, performed by a detailed diagnosis request unit of the first diagnostic device, that sends diagnostic request data, which includes diagnostic object data in a fixed period including a point in time at which an abnormal condition was sensed by the diagnostic unit, to the second diagnostic device, receives a diagnostic result thereof, and outputs the diagnostic result from the output device; a diagnostic step, performed by a diagnostic unit of the second diagnostic device, that diagnoses the diagnostic object by applying a diagnostic rule, stored in a diagnostic rule storage unit, to the diagnostic request data received from the first diagnostic device; a diagnostic result response step, performed by a diagnostic result response unit of the second diagnostic device, that sends a diagnostic result of the diagnostic request data to the first diagnostic device that is a diagnosis requesting device; a diagnostic case data sending step, performed by a diagnostic case data sending unit of the second diagnostic device, that sends diagnostic case data, which includes the diagnostic case data in the diagnostic request data and a diagnostic result thereof, to the diagnostic rule generation device; a diagnostic rule update step, performed by a diagnostic rule update unit of the second diagnostic device, that updates the diagnostic rule storage unit with the diagnostic rule received from the diagnostic rule generation device; a diagnostic case data reception step, performed by a diagnostic case data reception unit of the diagnostic rule generation device, that stores the diagnostic case data, received from the second diagnostic device, in a diagnostic case data storage unit; a diagnostic rule generation step, performed by a diagnostic rule generation unit of the diagnostic rule generation device, that generates a diagnostic rule based on the diagnostic case data stored in the diagnostic case data storage unit; and a diagnostic rule sending step, performed by a diagnostic rule sending unit of the diagnostic rule generation device, that sends the diagnostic rule, generated by the diagnostic rule generation unit, to the second diagnostic device.

A fifth diagnostic method of the present invention is a diagnostic method for use in a diagnostic system in which a plurality of first diagnostic devices each of which senses an abnormal condition of a diagnostic object is communicably connected to a second diagnostic device that diagnoses more in detail a state of the diagnostic object in which an abnormal condition was detected by the first diagnostic device and, at the same time, generates a diagnostic rule used for a diagnosis. The diagnostic method comprises: a diagnostic step, performed by a diagnostic unit of the first diagnostic device, that senses an abnormal condition of a diagnostic object based on diagnostic object data measured on the diagnostic object; a detailed diagnosis request step, performed by a detailed diagnosis request unit of the first diagnostic device, that sends diagnostic request data, which includes diagnostic object data in a fixed period including a point in time at which an abnormal condition was sensed by the diagnostic unit, to the second diagnostic device, receives a diagnostic result thereof, and outputs the diagnostic result from the output device; a diagnostic step, performed by a diagnostic unit of the second diagnostic device, that diagnoses the diagnostic object by applying a diagnostic rule, stored in a diagnostic rule storage unit, to the diagnostic request data received from the first diagnostic device; a diagnostic result response step, performed by a diagnostic result response unit of the second diagnostic device, that sends a diagnostic result of the diagnostic request data to the first diagnostic device that is a diagnosis requesting device; a diagnostic rule generation step, performed by a diagnostic rule generation unit of the second diagnostic device, that generates a diagnostic rule based on diagnostic case data which includes the diagnostic object data in the diagnostic request data and a diagnostic result thereof; and a diagnostic rule update step, performed by a diagnostic rule update unit of the second diagnostic device, that updates the diagnostic rule storage unit with the diagnostic rule generated by the diagnostic rule generation device.

In a third aspect of the present invention, there is provided a diagnostic rule generation device. A first diagnostic rule generation device of the present invention is a diagnostic rule generation device that is communicably connected to a plurality of diagnostic devices each of which diagnoses a diagnostic object by applying a diagnostic rule to diagnostic object data measured on the diagnostic object. The diagnostic rule generation device comprises: a diagnostic case data reception unit that receives diagnostic case data, which includes the diagnostic object data and a diagnostic result thereof, from the plurality of diagnostic devices; a diagnostic rule generation unit that generates a diagnostic rule based on the diagnostic case data received from the plurality of diagnostic devices; and a diagnostic rule sending unit that sends the diagnostic rule, generated by the diagnostic rule generation unit, to the diagnostic devices.

A second diagnostic rule generation device of the present invention is a diagnostic rule generation device that diagnoses a diagnostic object by applying a diagnostic rule to diagnostic object data measured on the diagnostic object and that is communicably connected to a plurality of diagnostic devices each of which generates a diagnostic rule based on diagnostic case data that includes the diagnostic object data and a diagnostic result thereof. The diagnostic rule generation device comprises: a diagnostic rule reception unit that receives the generated diagnostic rules from the plurality of diagnostic devices; a diagnostic rule generation unit that generates an integrated diagnostic rule from the plurality of diagnostic rules received from the plurality of diagnostic devices; and a diagnostic rule sending unit that sends the diagnostic rule, generated by the diagnostic rule generation unit, to the diagnostic devices.

A third diagnostic rule generation device of the present invention is a diagnostic rule generation device that is communicably connected to a detailed diagnostic device that, based on a diagnostic request from the plurality of diagnostic devices each of which senses an abnormal condition of a diagnostic object, diagnoses more in detail the diagnostic object data on the diagnostic object, in which an abnormal condition was detected by the diagnostic device, based on a diagnostic rule. The diagnostic rule generation device comprises: a diagnostic case data reception unit that receives diagnostic case data, which includes the diagnostic object data and a diagnostic result thereof, from the detailed diagnostic device; a diagnostic rule generation unit that generates a diagnostic rule based on the diagnostic case data received from the detailed diagnostic device; and a diagnostic rule sending unit that sends the diagnostic rule, generated by the diagnostic rule generation unit, to the detailed diagnostic device.

In a fourth aspect of the present invention, there is provided a detailed diagnostic device. A detailed diagnostic device of the present invention is a detailed diagnostic device that receives a diagnostic request from a plurality of diagnostic devices, each of which senses an abnormal condition of a diagnostic object, and diagnoses more in detail diagnostic object data on the diagnostic object, in which an abnormal condition was sensed by the diagnostic device, based on a diagnostic rule. The detailed diagnostic device comprises: a diagnostic rule storage unit that stores a diagnostic rule; a diagnostic unit that diagnoses the diagnostic object by applying the diagnostic rule to the diagnostic object data in diagnostic request data received from the diagnostic device; a diagnostic result response unit that sends a diagnostic result of the diagnostic request data to the diagnostic device that is a requesting diagnostic device; a diagnostic rule generation unit that generates a diagnostic rule based on diagnostic case data which includes the diagnostic object data in the diagnostic request data and a diagnostic result thereof; and a diagnostic rule update unit that updates the diagnostic rule storage unit with the diagnostic rule generated by the diagnostic rule generation device.

In a fifth aspect of the present invention, the present invention provides programs that cause a computer to function or operate as the diagnostic system, diagnostic method, diagnostic rule generation method, and detailed diagnostic device in the first to fourth aspects.

Operation

Even if each diagnostic object is so reliable that an abnormal condition rarely occurs, the abnormal condition occurrence frequency will increase as viewed as a whole thereof, in a case where multiple of such diagnostic objects are present. Therefore, an amount of case data necessary that generates a diagnostic rule may be collected from multiple diagnostic objects even for a fault for which a sufficient number of effective cases could not be collected if diagnostic case data is collected from one diagnostic object.

The configuration of the present invention enables a diagnostic system, which diagnoses diagnostic objects by applying a diagnostic rule to data measured on the diagnostic objects, to generate a diagnostic rule based on various types of case data, thus increasing the diagnostic accuracy.

BRIEF DESCRIPTION OF THE DRAWINGS

FIG. 4 is a diagram showing an example of the format of diagnostic case data.

EXPLANATIONS OF SYMBOLS

100,300,400,500 . . . Diagnostic system
101,301,401 . . . Diagnostic device
102,302,402 . . . Diagnostic rule generation device
103 . . . Network
104 . . . Diagnostic object
403,501 . . . Detailed diagnostic device

PREFERRED MODES

First Exemplary Embodiment

Figure 1:
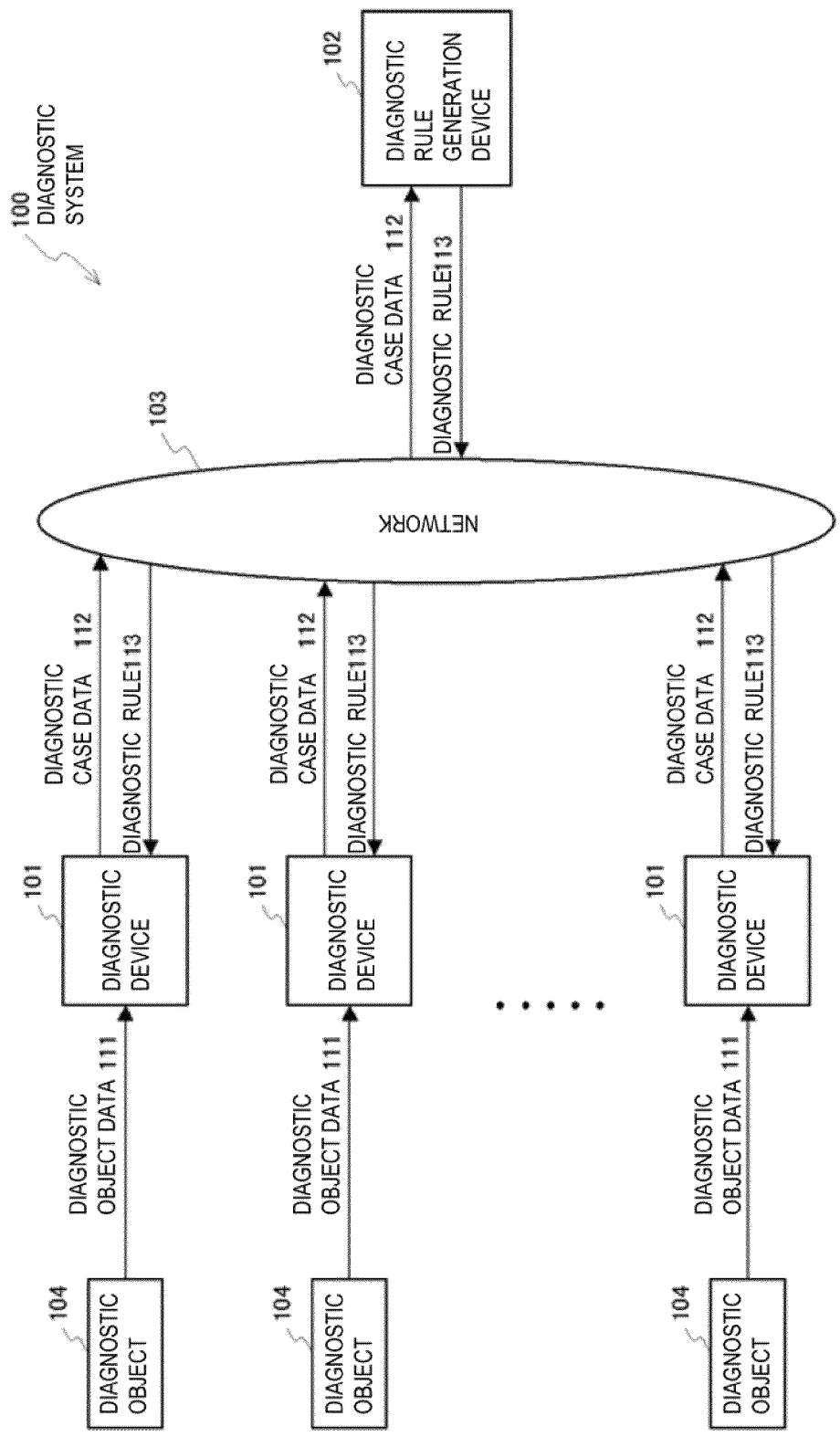
FIG. 1 is a block diagram of a diagnostic system in a first exemplary embodiment of the present invention.

Referring to FIG. 1, a diagnostic system 100 in a first exemplary embodiment of the present invention comprises N(N≧2) diagnostic devices 101 and one diagnostic rule generation device 102 connected via a network 103 for mutual communication.

The network 103 is configured by a LAN, a WAN, a mobile phone network, or the Internet.

Each diagnostic device 101 is installed outside a diagnostic object 104 to be diagnosed by the device or inside the diagnostic object 104. The diagnostic object 104 to be diagnosed by each diagnostic device 101 is a device such as a mobile phone device or various plant facilities. Although physically different, the diagnostic objects 104 are of the same type. For example, they are devices, machines, or plant facilities of the same type. Each diagnostic object 104 has one or more sensors installed thereon to allow data, measured by the sensors, to be input to each diagnostic device 101 as diagnostic object data 111. The type of data to be measured and the format of the diagnostic object data 111 are common through all diagnostic objects 104.

Data to be measured may be real values or symbol values. Data to be measured may or may not be time-series data. In addition, data generated by performing a predetermined operation for sensor-measured data may be used as the diagnostic object data 111. The predetermined operation is, for example, an operation in which each piece of sensor-measured data is converted to the time-series rate of change that changes over time and an operation in which dimension reduction is performed to convert the dimension to a lower dimension. In theory, one type of data may be used though in general there are several types of data. The diagnostic object data 111 at time t is represented as $ut1, ut2, \ldots, utm$, where m is the data type and uti is the ith measurement data measured at time t.

Each diagnostic device 101 has the function to apply a diagnostic rule, stored in the diagnostic device, to the received diagnostic object data 111 to diagnose the diagnostic object 104. Each diagnostic device 101 also has the function to send diagnostic case data 112, which includes the diagnostic object data 111 and its diagnostic result, to the diagnostic rule generation device 102 over the network 103 and the function to receive diagnostic rule 113 from the diagnostic rule generation device 102 to update the diagnostic rule stored in the diagnostic device. All diagnostic devices 101 have the same configuration and the same function including the type of diagnostic rule that is used and the diagnostic method that uses the diagnostic rule.

The diagnostic rule generation device 102 has the function to receive the diagnostic case data 112 from the diagnostic devices 101 over the network 103, to generate a new diagnostic rule, using the diagnostic case data 112 received from multiple diagnostic devices 101, for use by the diagnostic devices 101 in the diagnosis, and to send the generated diagnostic rule to the diagnostic devices 101 over the network 103.

The general operation of the diagnostic system 100 in this exemplary embodiment, configured as described above, is as follows.

Each diagnostic device 101 receives the diagnostic object data 111 measured on the diagnostic object 104 corresponding to the diagnostic device and applies the diagnostic rule, held in the diagnostic device, to perform several types of diagnosis defined by the diagnostic rule; for example, the diagnostic device checks if there is an abnormal condition in the diagnostic object 104 and estimates the cause of the abnormal condition. And, the diagnostic device 101 sends the diagnostic case data 112, which includes the diagnostic object data 111 and the diagnostic result, to the diagnostic rule generation device 102 over the network 103.

The diagnostic rule generation device 102 accumulates therein the diagnostic case data 112 received from the diagnostic devices 101. After the diagnostic case data 112 are accumulated enough that generates a diagnostic rule, the diagnostic rule generation device 102 uses the diagnostic case data to generate (learn) a diagnostic rule and sends the generated diagnostic rule to the diagnostic devices 101 over the network 103.

Each diagnostic device 101 updates the diagnostic rule, stored in the device, with the diagnostic rule received from the diagnostic rule generation device 102. After that, the diagnostic device 101 uses the updated diagnostic rule to diagnose the diagnostic object data 111 measured on the diagnostic object 104.

Next, the following describes the diagnostic device 101 and the diagnostic rule generation device 102 in detail.

Figure 2:
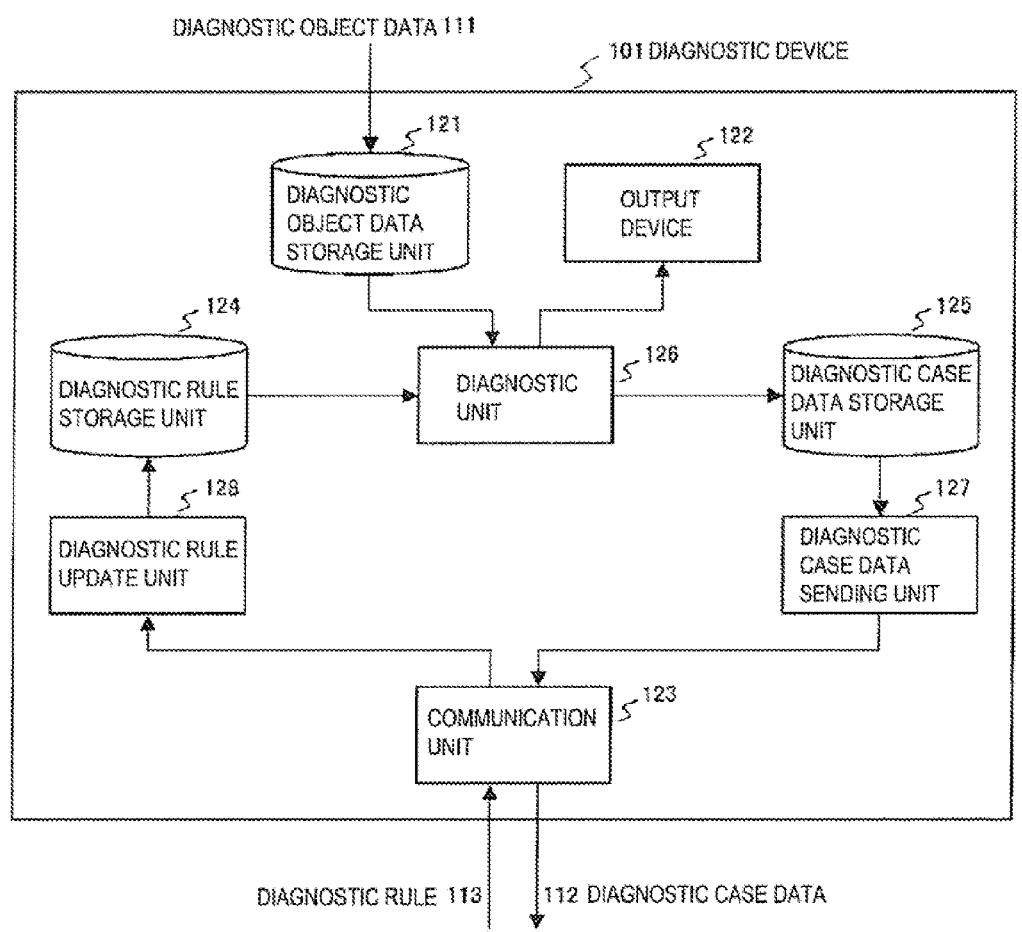
FIG. 2 is a block diagram showing a diagnostic device of the diagnostic system in the first exemplary embodiment of the present invention.

Referring to FIG. 2, each diagnostic device 101 comprises a diagnostic object data storage unit 121 that stores the diagnostic object data 111 measured on the diagnostic object 104; an output device 122 such as a display device; a communication unit 123 used that sends and receiving the diagnostic case data 112 and the diagnostic rule 113 to and from the diagnostic rule generation device 102 over the network 103 via cable or wirelessly; a diagnostic rule storage unit 124 that stores a diagnostic rule; a diagnostic case data storage unit 125 that stores diagnostic case data including diagnostic object data and its diagnostic result; a diagnostic unit 126 that applies the diagnostic rule, read from the diagnostic rule storage unit 124, to diagnostic object data, read from the diagnostic object data storage unit 121, to diagnose the diagnostic object 104, outputs the diagnostic result to the output device 122 and, at the same time, saves the diagnostic case data, including the diagnostic object data and the diagnostic result, in the diagnostic case data storage unit 125; a diagnostic case data sending unit 127 that sends the diagnostic case data, stored in the diagnostic case data storage unit 125, to the diagnostic rule generation device 102 via the communication unit 123 over the network 103; and diagnostic rule update unit 128 that receives a diagnostic rule, received from the diagnostic rule generation device 102, from the communication unit 123 and updates the diagnostic rule storage unit 124.

Figure 3:
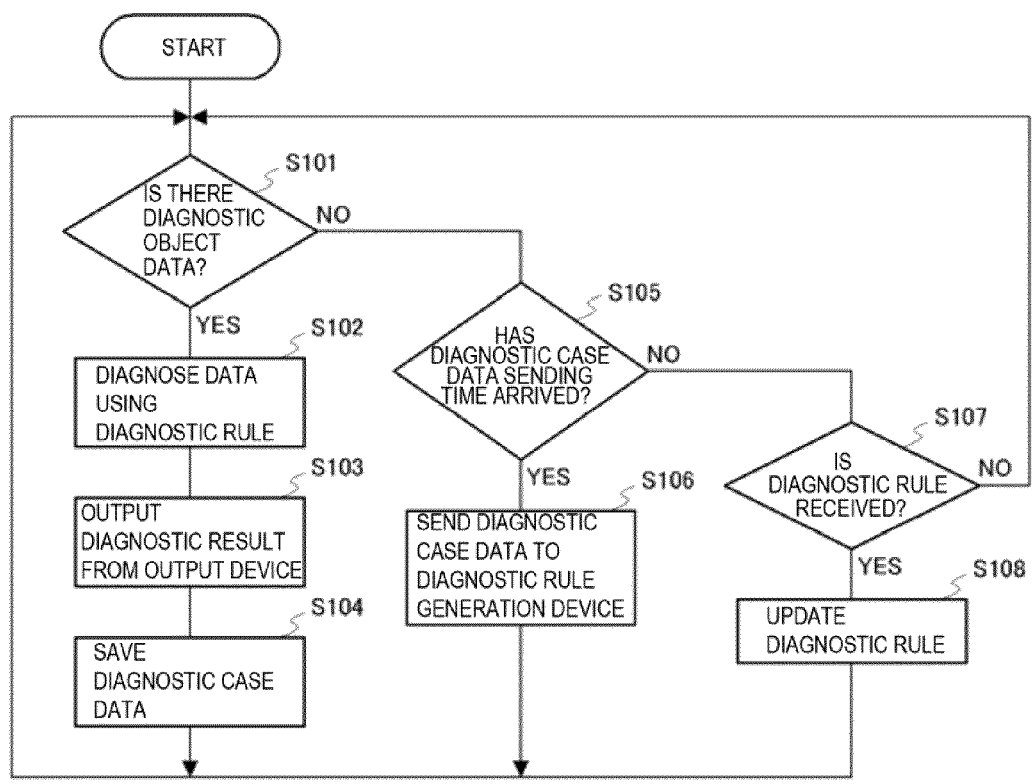
FIG. 3 is a flowchart showing an example of processing of the diagnostic device of the diagnostic system in the first exemplary embodiment of the present invention.

Next, referring to FIG. 3, the following describes the operation of each diagnostic device 101.

The diagnostic object data 111 measured on the diagnostic object 104 is input to the corresponding diagnostic device 101 and is accumulated in the diagnostic object data storage unit 121 in that diagnostic device 101 with a unique data number assigned. If the diagnostic object data storage unit 121 stores unprocessed diagnostic object data 111 (YES in S101), the diagnostic unit 126 of the diagnostic device 101 reads the unprocessed diagnostic object data 111 from the diagnostic object data storage unit 121 and applies the diagnostic rule, stored in the diagnostic rule storage unit 124, to diagnose the diagnostic object data 111 (S102). Next, the diagnostic unit 126 outputs the diagnostic result from the output device 122 (S103) and, at the same time, saves diagnostic case data, which includes the diagnostic object data 111 and its diagnostic result, in the diagnostic case data storage unit 125 (S104). The diagnostic results are, for example, information indicating that a fault occurred, the diagnostic result indicating its estimated cause, and information indicating that there is no fault and the operation is normal. The diagnostic result may be output only when an abnormal condition is detected by the diagnosis or may be output also when the condition is normal.

FIG. 4 is a diagram showing an example of diagnostic case data composed of a device number that uniquely identifies the diagnostic device 101, a data number that uniquely identifies the diagnostic case data among multiple pieces of diagnostic case data generated by the device, diagnostic object data, and a diagnostic result.

When a predetermined diagnostic case data sending time has arrived (YES in S105), the diagnostic case data sending unit 127 of each diagnostic device 101 reads all diagnostic case data from the diagnostic case data storage unit 125 and sends the diagnostic case data to the diagnostic rule generation device 102 via the communication unit 123 over the network 103 (S106). The sending time is when the diagnostic unit 126 writes diagnostic case data in the diagnostic case data storage unit 125, when a predetermined time interval has elapsed, or when a predetermined amount of diagnostic case data is saved.

When the diagnostic rule, sent from the diagnostic rule generation device 102, is received by the communication unit 123 (S107), the diagnostic rule update unit 128 of the diagnostic device 101 receives the diagnostic rule and updates the diagnostic rule stored in the diagnostic rule storage unit 124 (S108). The diagnostic rule is updated, for example, by replacing the original diagnostic rule with the latest diagnostic rule received immediately before or by adding the difference between the original diagnostic rule and the latest diagnostic rule.

Figure 5:
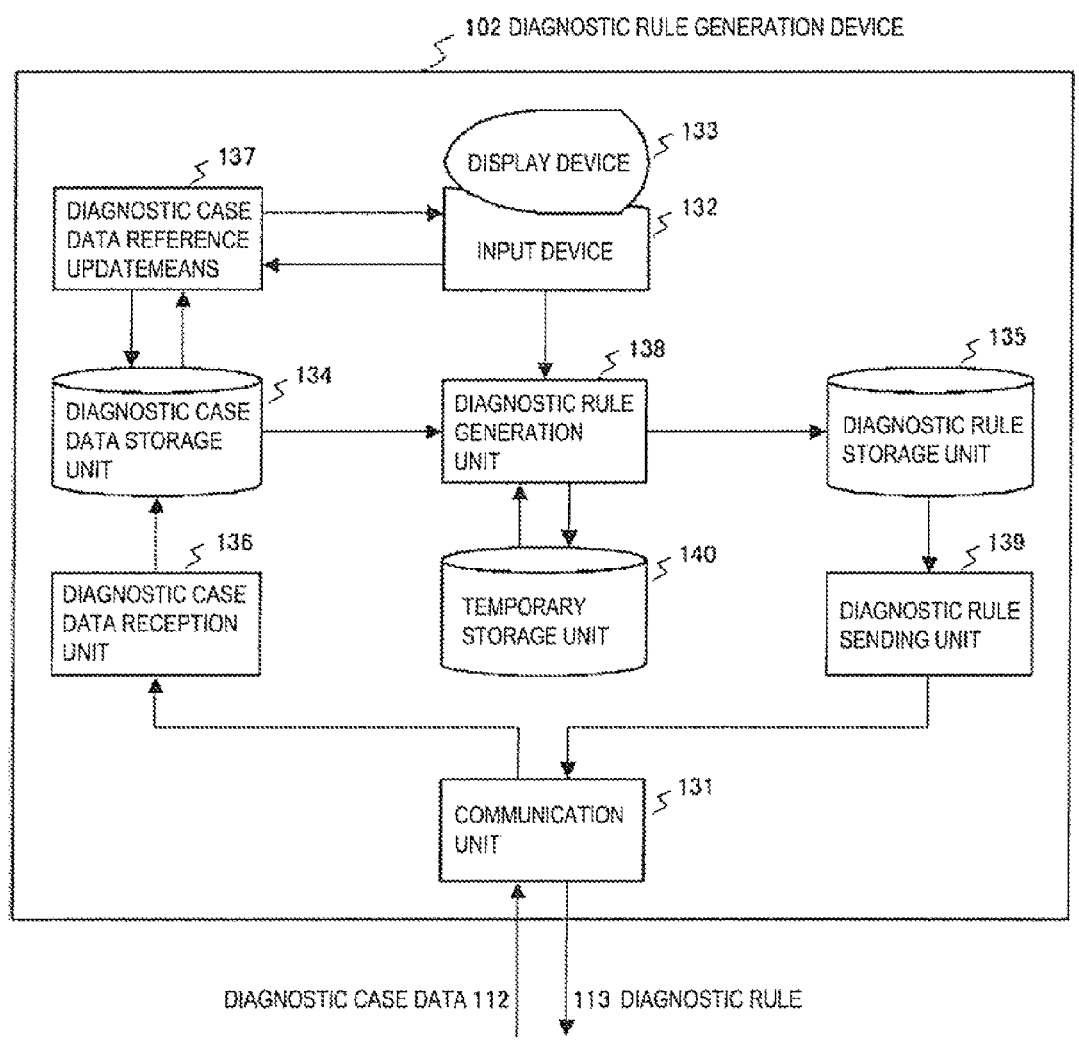
FIG. 5 is a block diagram showing a diagnostic rule generation device of the diagnostic system in the first exemplary embodiment of the present invention.

Referring to FIG. 5, the diagnostic rule generation device 102 comprises a communication unit 131 that sends and receives the diagnostic case data 112 and the diagnostic rule 113 to and from the diagnostic devices 101 via cable or wirelessly over the network 103; an input device 132 such as a keyboard; a display device 133 such a liquid crystal display; a diagnostic case data storage unit 134; a diagnostic rule storage unit 135; a diagnostic case data reception unit 136 that stores the diagnostic case data 112, received from the diagnostic devices 101, into the diagnostic case data storage unit 134; a diagnostic case data reference update unit 137 that displays diagnostic case data, stored in the diagnostic case data storage unit 134, on the display device 133 and modifies the diagnostic case data according to an input from the input device 132; a diagnostic rule generation unit 138 that generates a diagnostic rule based on the diagnostic case data, stored in the diagnostic case data storage unit 134, and stores the generated diagnostic rule in the diagnostic rule storage unit 135; a diagnostic rule sending unit 139 that reads diagnostic rule from the diagnostic rule storage unit 135 and sends them to the diagnostic devices 101 via the communication unit 131 over the network 103; and a temporary storage unit 140 that temporarily stores diagnostic case data used by the diagnostic rule generation unit 138 that generates a diagnostic rule.

Figure 6:
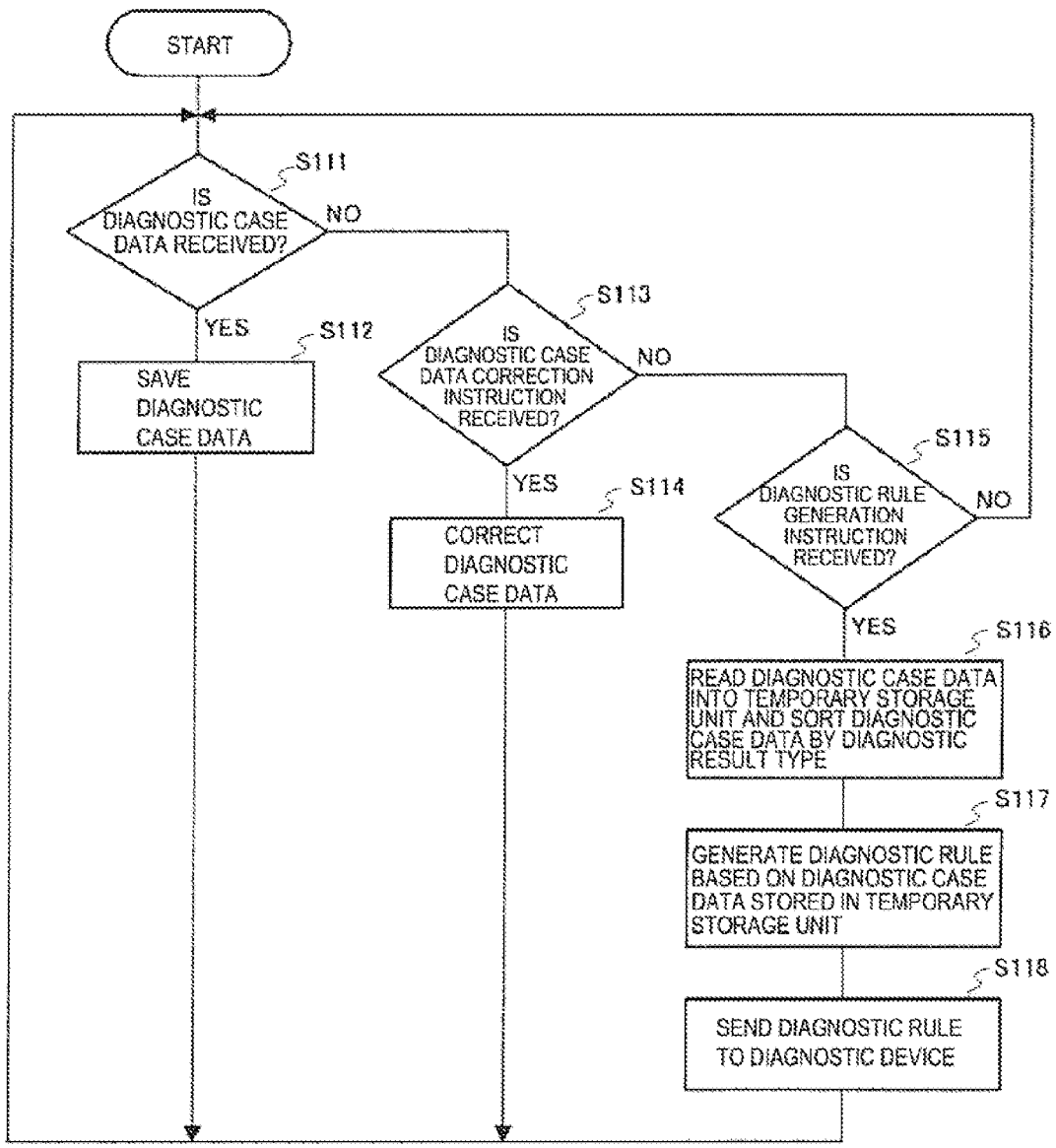
FIG. 6 is a flowchart showing an example of processing of the diagnostic rule generation device of the diagnostic system in the first exemplary embodiment of the present invention.

Next, the following describes the operation of the diagnostic rule generation device 102 with reference to FIG. 6.

When diagnostic case data is received from one of the diagnostic devices 101 (YES in S111), the diagnostic case data reception unit 136 of the diagnostic rule generation device 102 saves the received diagnostic case data in the diagnostic case data storage unit 134 (S112).

Figure 7:
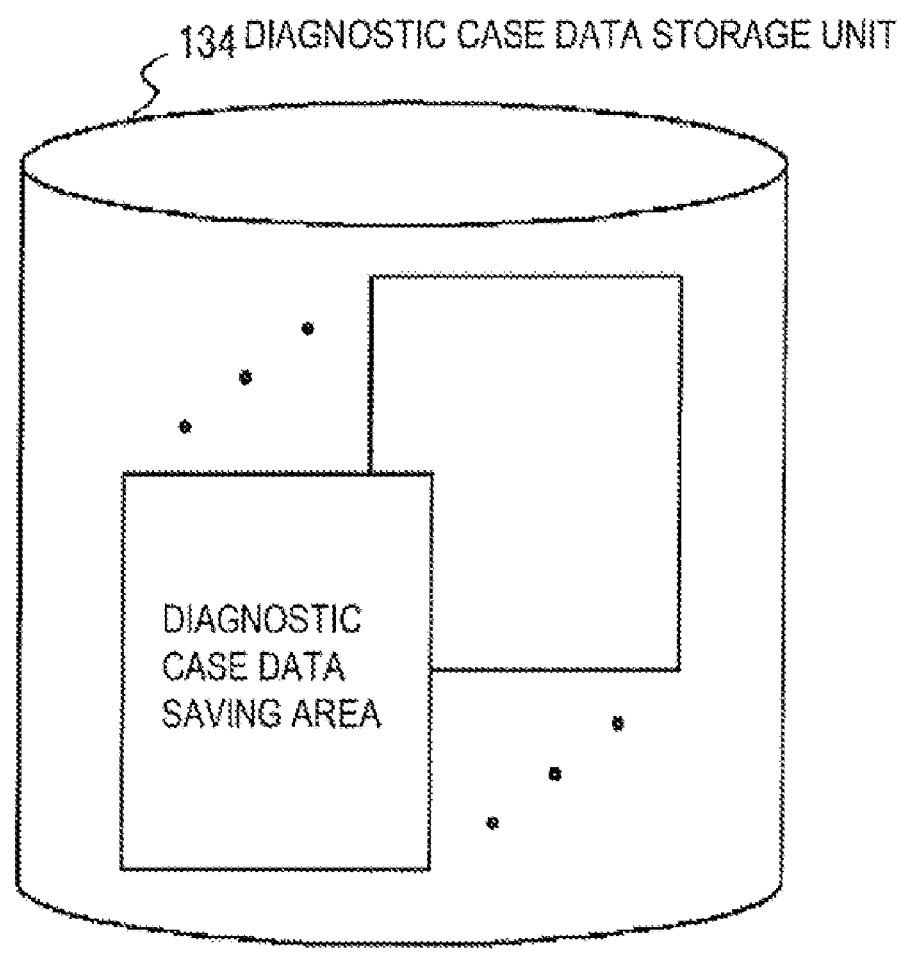
FIG. 7 is a diagram showing a diagnostic case data storage unit of the diagnostic rule generation device of the diagnostic system in the first exemplary embodiment of the present invention.

Referring to FIG. 7, the diagnostic case data storage unit 134 has diagnostic case data saving areas, one for the device number of each diagnostic device 101, and the diagnostic case data reception unit 136 saves the received diagnostic case data into the diagnostic case data saving area corresponding to the device number that matches the device number in the data. Note that diagnostic case data may be saved not only by diagnostic object but also in other methods, for example, by date or by diagnostic object residing area.

The diagnostic case data reference update unit 137 of the diagnostic rule generation device 102 displays the diagnostic case data, which is saved in the diagnostic case data storage unit 134, on the screen of the display device 133. And, when the user enters data from the input device 132 to change the diagnostic case data on the screen (S113), the diagnostic case data reference update unit 137 rewrites the original data, stored in the diagnostic case data storage unit 134, with the changed data (S114). The user changes the diagnostic case data based on the user's expertise, experiment results, or simulation results. For example, if the diagnostic object data in the diagnostic case data, which indicates only the diagnostic result indicating that fault A has occurred, is analyzed and the analysis result shows that the cause is a1, the user adds the cause a1 to the diagnostic result in the diagnostic case data. If it is confirmed that fault B, not detectable by the current diagnostic rule, occurs in the diagnostic case data that has been diagnosed as normal, the user rewrites the diagnostic result in the diagnostic case data from normal to fault B.

Figure 8:
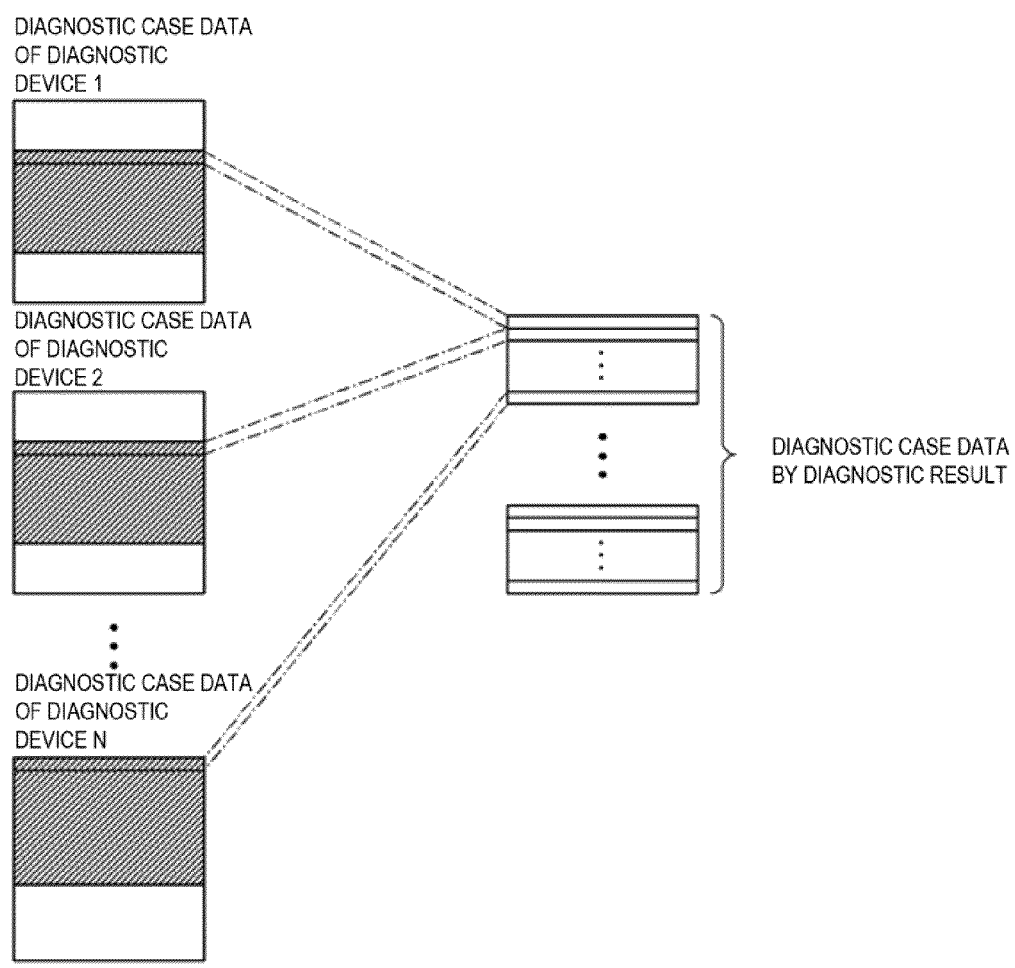
FIG. 8 is a diagram showing the operation of a diagnostic rule generation unit of the diagnostic rule generation device of the diagnostic system in the first exemplary embodiment of the present invention.

When the usage range of diagnostic case data is specified from the input device 132 to instruct the generation of a diagnostic rule (YES in S115), the diagnostic rule generation unit 138 of the diagnostic rule generation device 102 reads the diagnostic case data in the specified usage range from the diagnostic case data storage unit 134, stores the diagnostic case data, which has been read, in the temporary storage unit 140, and sorts the diagnostic case data by diagnostic result type (S116). For example, when parts of a set of diagnostic case data of N diagnostic devices 101, indicated by the broken lines as shown in FIG. 8, are specified by the user as the usage range, the diagnostic rule generation unit 138 reads diagnostic case data from those parts, stores the diagnostic case data in the temporary storage unit 140, and sorts the diagnostic case data according to the diagnostic result type included in the diagnostic case data. By dosing so, the diagnostic case data of the same diagnostic result, stored in multiple diagnostic devices 101, is collected into one set. In this case, the same diagnostic result refers to the diagnostic results that contain the same contents; for example, the diagnostic results contain information that fault A was caused by the cause a1 or that the operation was normal. Note that the method for collecting the diagnostic case data of the same diagnostic result from multiple diagnostic devices 101 is not limited to the sort processing described above; instead, the diagnostic case data storage unit 134 may be searched for the data having the same diagnostic result.

Next, the diagnostic rule generation unit 138 generates a diagnostic rule for estimating the state of the diagnostic object from the diagnostic object data based on the diagnostic case data, stored in the temporary storage unit 140 and classified by diagnostic type, and stores the generated diagnostic rule in the diagnostic rule storage unit 135 (S117). The diagnostic rule generation method depends on what type of diagnostic rule is used for diagnosis. For example, as described in Patent Document 1, fuzzy diagnostic rules are generated in a diagnostic system where multiple fuzzy symptoms and fuzzy diagnostic rules, which are obtained by making fuzzy the symptoms derived from data measured on a diagnostic object, are used to make a diagnosis through fuzzy pattern matching. In the diagnostic system described in Patent Document 2, if-then format diagnostic rules are generated. In addition, a diagnostic rule may be generated, for example, in one of the following methods.

An example of generating a diagnostic rule is a method that generates a diagnostic rule through learning using a classifier. More specifically, linear classifier learning, a neural network, a K-nearest neighbor classifier, a support vector machine, or a decision tree is used for learning. Those methods learn from data the function that receives data, to which an event label is attached, and outputs the label of data for which the label is unknown. In this case, data to which an event label is attached corresponds to the diagnostic object data and the diagnostic result included in the diagnostic case data, the data for which the label is unknown corresponds to the diagnostic object data 111 that is input to the diagnostic device 101, and the function corresponds to the diagnostic rule. The learning performed when an event label is attached to the learning data described above is called supervised learning, and the learning performed when an event label is attached to a part of the learning data is called semi-supervised learning. Any of the methods may be used to obtain a diagnostic rule through learning. The diagnostic device 101 inputs diagnostic object data into the diagnostic rule (function derived from learning) to produce the diagnostic result of the diagnostic object data 111.

Another example of generating a diagnostic rule is a method that generates a diagnostic rule through learning based on an association (correlation) rule. An association rule refers to a rule that shows an association, for example, an association indicating that, if one event represented by (attribute A is changed and attribute B is changed) occurs with respect to the diagnostic result X, another event represented by (attribute C is changed) is likely to occur. The rule is obtained by learning from diagnostic object data in multiple pieces of diagnostic case data with respect to the diagnostic result X, and the learning result is described in the if-then format. In this case, the diagnostic device 101 carries out a diagnosis by judging with which diagnostic result the diagnostic object data 111 matches based on the diagnostic rule (association rule) for each diagnostic result.

A still another example of generating a diagnostic rule is a method for obtaining a diagnostic rule through learning based on the anomaly detection technology. More specifically, this method learns from the statistical distribution (for example, contaminated normal distribution) of diagnostic object data in the diagnostic case data corresponding to each diagnostic result as described in Patent Document 3, and the sufficient statistic of the statistical distribution (for example, the average and variance when the distribution is a normal distribution) is used for the diagnostic rule. In this case, the diagnostic device 101 makes a diagnosis based on the anomaly score (for example, log-loss or Hellinger score) of the diagnostic object data 111 calculated from the diagnostic rule (statistical distribution). Instead of a statistical distribution, it is also possible to use a method for determining if data belongs to a diagnostic object event by means of a one-class support vector machine as described in Patent Document 4.

When pattern matching is used for the diagnosis, a set of reference patterns is used as the diagnostic rule. Each reference pattern, which corresponds to one of diagnostic results, is generated by calculating the simple average or the weighted average of the diagnostic object data included in multiple pieces of diagnostic case data corresponding to that diagnostic result. In this case, the diagnostic device 101 makes a diagnosis through pattern matching between the diagnostic object data 111 and the reference patterns.

It should be noted that the diagnostic rule obtained through learning may include not only a diagnostic rule for sensing a fault or diagnostic rules for estimating the cause of a generated fault but also a diagnostic rule for sensing that the diagnostic object is normal. In this case, for the diagnostic object data 111 that is diagnosed neither as normal by any diagnostic rule for sensing a normal state nor as failing by any diagnostic rule that diagnoses a fault, the diagnostic device 101 may generate a diagnostic result indicating whether or not a fault is generated is unknown.

After the diagnostic rule generation unit 138 finishes the generation of a diagnostic rule, the diagnostic rule sending unit 139 reads the diagnostic rule from the diagnostic rule storage unit 135 and sends the diagnostic rule to all diagnostic devices 101 via the communication unit 131 over the network 103 (S118). This allows the diagnostic device 101 to update the existing diagnostic rule with the diagnostic rule, which has been received, as described above.

The following describes the effect of this exemplary embodiment.

According to this exemplary embodiment, a diagnostic rule may be updated based on various types of case data. The reason is that diagnostic case data can be collected from N diagnostic devices 101 that diagnose the diagnostic object 104 of the similar type. That is, even if individual diagnostic objects 104 are so reliable that faults rarely occur, faults occur N times more frequently. And so, this configuration allows a required number of pieces of data, necessary that generates a diagnostic rule, to be collected for a fault for which a sufficient number of effective cases would not be collected if diagnostic case data is collected from one diagnostic object 104 only. In particular, multiple diagnostic devices 101 and the diagnostic rule generation device 102 are connected via the network 103 to enable the diagnostic rule generation device 102 to remotely collect diagnostic case data from multiple distant diagnostic devices 101. For this reason, this exemplary embodiment is applicable, for example, to a configuration where case data on a fault, which is easily generated in a low-temperature environment, is collected from the diagnostic object 104 located in a low-temperature area, and case data on a fault, which is easily generated in a high-temperature environment, is collected from the diagnostic object 104 located in a high-temperature area, meaning that fault case data in different environments may be collected at a time. Another advantage of this exemplary embodiment is that, even if there is a bias in normal-time diagnostic case data due to the usage mode or the environment of a particular diagnostic object, diagnostic case data is collected from multiple diagnostic objects 104 and so normal-time diagnostic case data with lower bias may be obtained.

According to this exemplary embodiment, the existing diagnostic rule of the diagnostic device 101 may be remotely updated by diagnostic rule generated based on collected case data. The reason is that, in a configuration where multiple diagnostic devices 101 and the diagnostic rule generation device 102 are connected via the network 103, the diagnostic rule generated by the diagnostic rule generation device 102 is sent to the diagnostic devices 101 via the network to update the diagnostic rule of the diagnostic devices 101.

Second Exemplary Embodiment

In the first exemplary embodiment described above, each diagnostic device sends all diagnostic case data, including the diagnostic result, to the diagnostic rule generation device. In contrast, in this exemplary embodiment, each diagnostic device selectively sends only diagnostic case data that is considered important. This exemplary embodiment is similar to the first exemplary embodiment except a part of the diagnostic device.

Figure 9:
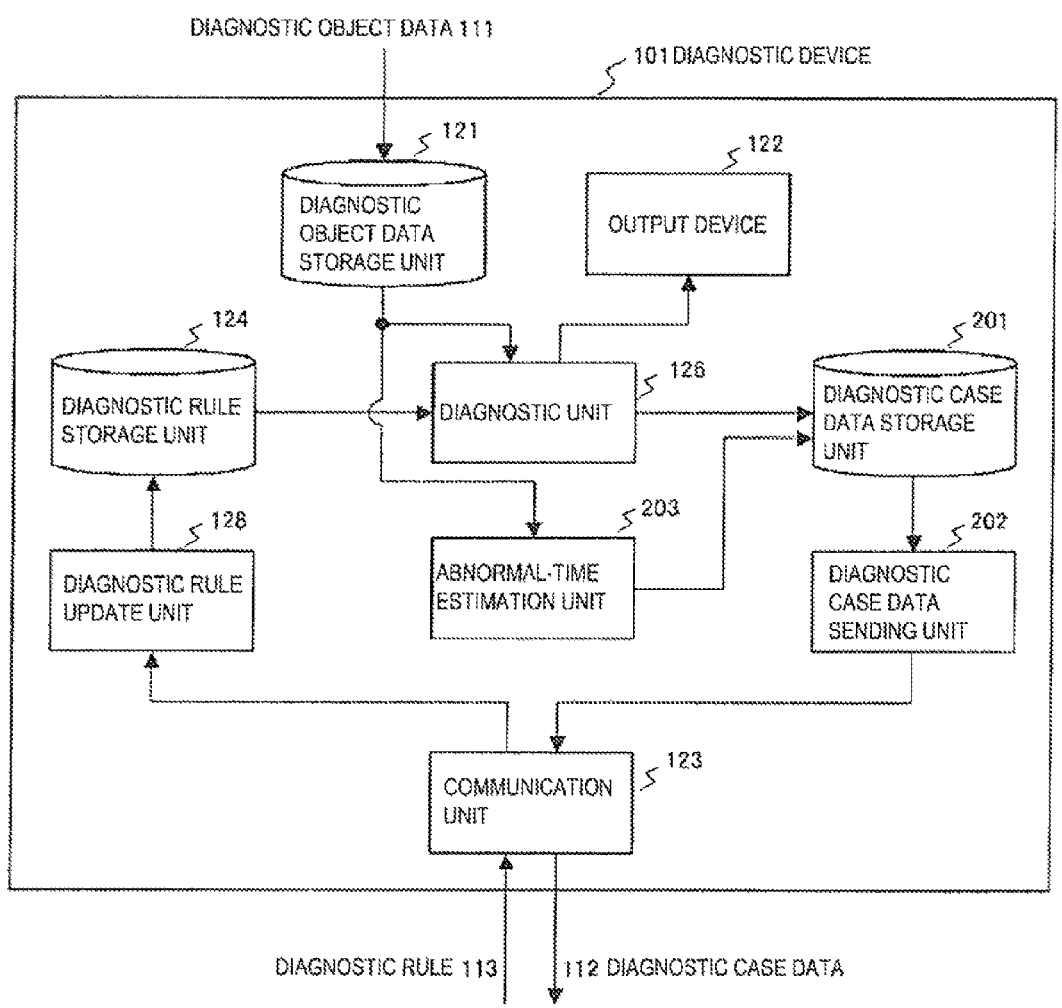
FIG. 9 is a block diagram showing a diagnostic device of a diagnostic system in a second exemplary embodiment of the present invention.

Referring to FIG. 9, a diagnostic device 101 used in this exemplary embodiment is similar to the diagnostic device 101 in the first exemplary embodiment shown in FIG. 2 except that the diagnostic case data storage unit 125 and the diagnostic case data sending unit 127 are replaced respectively by a diagnostic case data storage unit 201 and a diagnostic case data sending unit 202 and that an abnormal-time estimation unit 203 is newly added.

The abnormal-time estimation unit 203 is a unit that detects if diagnostic object data, read from a diagnostic object data storage unit 121, is data at a time-series change point or an outlier of a data distribution.

One of the methods that detects if diagnostic object data is data at a time series change point is the change point detection method proposed in Non-Patent Document 1. This method learns from time series data by means of an auto-regressive model. Each time time-series data is obtained, the outlier level from the probability distribution of data, calculated from the model described above, is calculated. The outlier level is calculated, for example, as the log likelihood of data, Hellinger score between the probability distribution obtained by learning from data not including the obtained data and the probability distribution obtained by learning from data including the obtained data, or a distance between the center of the probability distribution and the data. This outliner level is compared with a threshold and, based on the comparison result, it is judged if the time-series data is at a change point or not. In the Non-Patent Document 1, the method also learns from time series data on the calculated outlier levels (moving averaged) by means of an auto-regressive model. And, each time the outlier level of newly obtained data is calculated, the outliner level of outlier levels is calculated from the probability distribution of the outlier levels calculated from the model described above. This outlier level of outlier levels is compared with the threshold and, based on this comparison result, it is also possible to judge if the time series data is at a change point. Based on the concept that a change level is calculated from an outlier level from the probability distribution of a time series model, the outlier level may also be calculated, not by an auto-regressive model, but by a Markov model or a hidden Markov level, when time series data is represented by symbol values. Although the learning in Non-Patent Document 1 has a past-forgetting effect, the forgetting effect may or may not be required for the learning when the method is applied to the present invention.

One of the methods that detects if diagnostic object data is an outlier of a data distribution is as follows. That is, the method obtains a statistical distribution (for example, contaminated normal distribution) by learning from diagnostic object data in a period during which a diagnostic unit 126 does not detect an abnormal condition and, based on the anomaly score (for example, log loss, Hellinger score) of the diagnostic object data 111 calculated from the statistical distribution, detects if the diagnostic object data 111 is an outlier of the distribution of data. Another method, for example, one class SVM, may also be used in which an outlier is detected by judging if data is included in a class.

If diagnostic object data read from the diagnostic object data storage unit 121 is data at a time series change point or an outliner of the distribution of data, the abnormal-time estimation unit 203 stores the data number, assigned to the diagnostic object data, in the diagnostic case data storage unit 201 as an abnormal-time data number.

In the diagnostic case data storage unit 201, the diagnostic case data on each piece of diagnostic object data, diagnosed by the diagnostic unit 126, and the abnormal-time data number, generated by the abnormal-time estimation unit 203, are recorded.

When a predetermined sending time has arrived, the diagnostic case data sending unit 202 checks if abnormal-time data numbers are recorded in the diagnostic case data storage unit 201. If they are recorded, the diagnostic case data sending unit 202 selects, for each abnormal-time data number, diagnostic case data having that data number and sends the selected diagnostic case data to a diagnostic rule generation device 102 via a communication unit 123 over a network 103. In addition to diagnostic case data having an abnormal-time data number, its preceding and following data or a fixed period of diagnostic case data may be selected and sent.

In this exemplary embodiment, each diagnostic device 101 selects diagnostic object data, which is at a time-series change point or is an outlier of a data distribution, or several pieces of diagnostic object data before and after such data and sends the selected data to the diagnostic rule generation device 102. In general, because a time-series change point or a point at which an outlier of a data distribution occurs is a point in time at which a fault occurs, the diagnostic object data for a fixed period of time including that point is efficient case data characterizing the fault and is useful that generates a diagnostic rule. In addition, unlike the case where all diagnostic case data is sent to the diagnostic rule generation device 102, this configuration eliminates the need to send the same non-changed diagnostic object data redundantly, thus reducing the amount of communication.

Third Exemplary Embodiment

In the first and second exemplary embodiments described above, each diagnostic device sends diagnostic case data to the diagnostic rule generation device. In contrast, in this exemplary embodiment, each diagnostic device has the function to generate a diagnostic rule based on its own diagnostic case data. The diagnostic device sends the generated diagnostic rule to the diagnostic rule generation device, which generates a (integrated) diagnostic rule by integrating the diagnostic rules, received from multiple diagnostic devices, and sends the generated diagnostic rule to the diagnostic devices.

Figure 10:
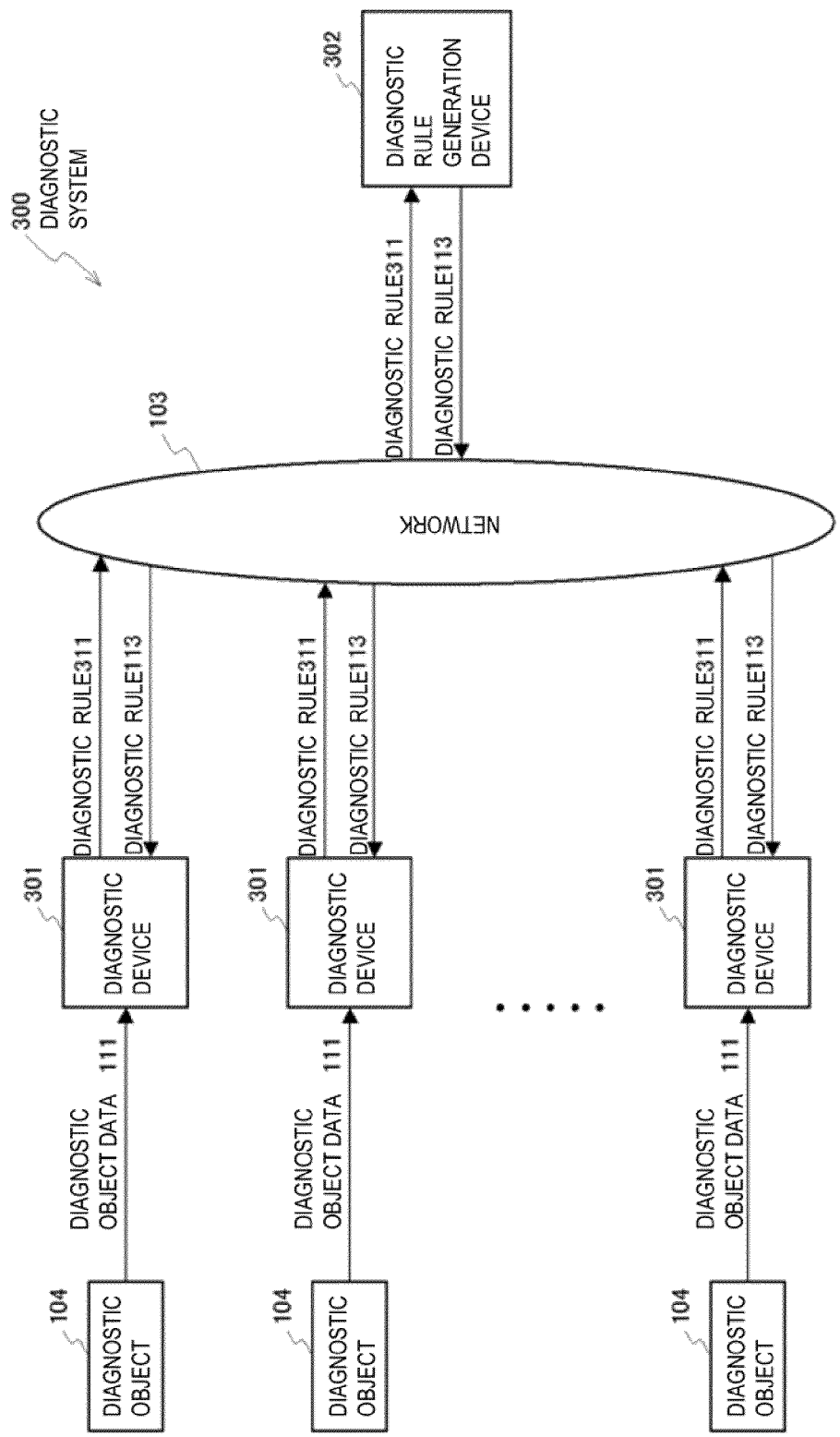
FIG. 10 is a block diagram showing a diagnostic system in a third exemplary embodiment of the present invention.

Referring to FIG. 10, a diagnostic system 300 in a third exemplary embodiment of the present invention comprises N(≧2) diagnostic devices 301 and one diagnostic rule generation device 302 that are connected via a network 103, similar to the one in the first exemplary embodiment, for mutual communication.

Each diagnostic device 301 has the function to apply the diagnostic rule, stored in the device, to received diagnostic object data 111 that diagnoses a diagnostic object 104. In addition, each diagnostic device 301 has the function to generate a diagnostic rule 311 using diagnostic case data that includes the diagnostic object data 111 and its diagnostic result, the function to send the generated diagnostic rule 311 to the diagnostic rule generation device 302 over the network 103, and the function to receive a diagnostic rule 113 from the diagnostic rule generation device 302 and update the diagnostic rule stored in the device. All diagnostic devices 301 have the same configuration and the function including the type of diagnostic rule, which are used, and the diagnosis method performed using the diagnostic rule.

The diagnostic rule generation device 302 has the function to receive the diagnostic rules 311 from the diagnostic devices 301 over the network 103, to generate the diagnostic rule 113, which will be used by the diagnostic devices 301 in diagnosis, using the diagnostic rules 311 received from the multiple diagnostic devices 301, and to send the generated diagnostic rule 113 to the diagnostic devices 301 over the network 103.

The general operation of the diagnostic system 300 in this exemplary embodiment, which is configured as described above, is follows.

Each diagnostic device 301 receives the diagnostic object data 111 measured on the diagnostic object 104 corresponding to the device itself and makes several types of diagnosis, defined by the diagnostic rule, by applying the diagnostic rule held in the device; for example, the diagnostic device 301 checks if an abnormal condition occurs in the diagnostic object 104 and, if so, estimates the cause of the abnormal condition. The diagnostic device 301 accumulates diagnostic case data, including the diagnostic object data 111 and its diagnostic result, in the device and, when the number of pieces of diagnostic case data required that generates a diagnostic rule are accumulated, uses the diagnostic case data to generate (learn) the diagnostic rule 311, and sends the generated diagnostic rule to the diagnostic rule generation device 302 via the network 103.

The diagnostic rule generation device 302 accumulates therein the diagnostic rule 311 received from the diagnostic devices 301. And, when the diagnostic rules 311 for all diagnostic devices 301 or for the number of diagnostic devices 301 equal to or larger than the predetermined number of devices are accumulated, the diagnostic rule generation device 302 generates the diagnostic rule 113, created by integrating the diagnostic rules 311, and sends the generated diagnostic rule 113 to the diagnostic devices 301 over the network 103.

Each diagnostic device 301 updates the diagnostic rule, stored in the device itself, using the diagnostic rule received from the diagnostic rule generation device 302. From this time on, each diagnostic device 301 uses the updated diagnostic rule to make the diagnosis of the diagnostic object data 111 measured on the diagnostic object 104.

Next, the following describes the diagnostic device 301 and the diagnostic rule generation device 302 in detail.

Figure 11:
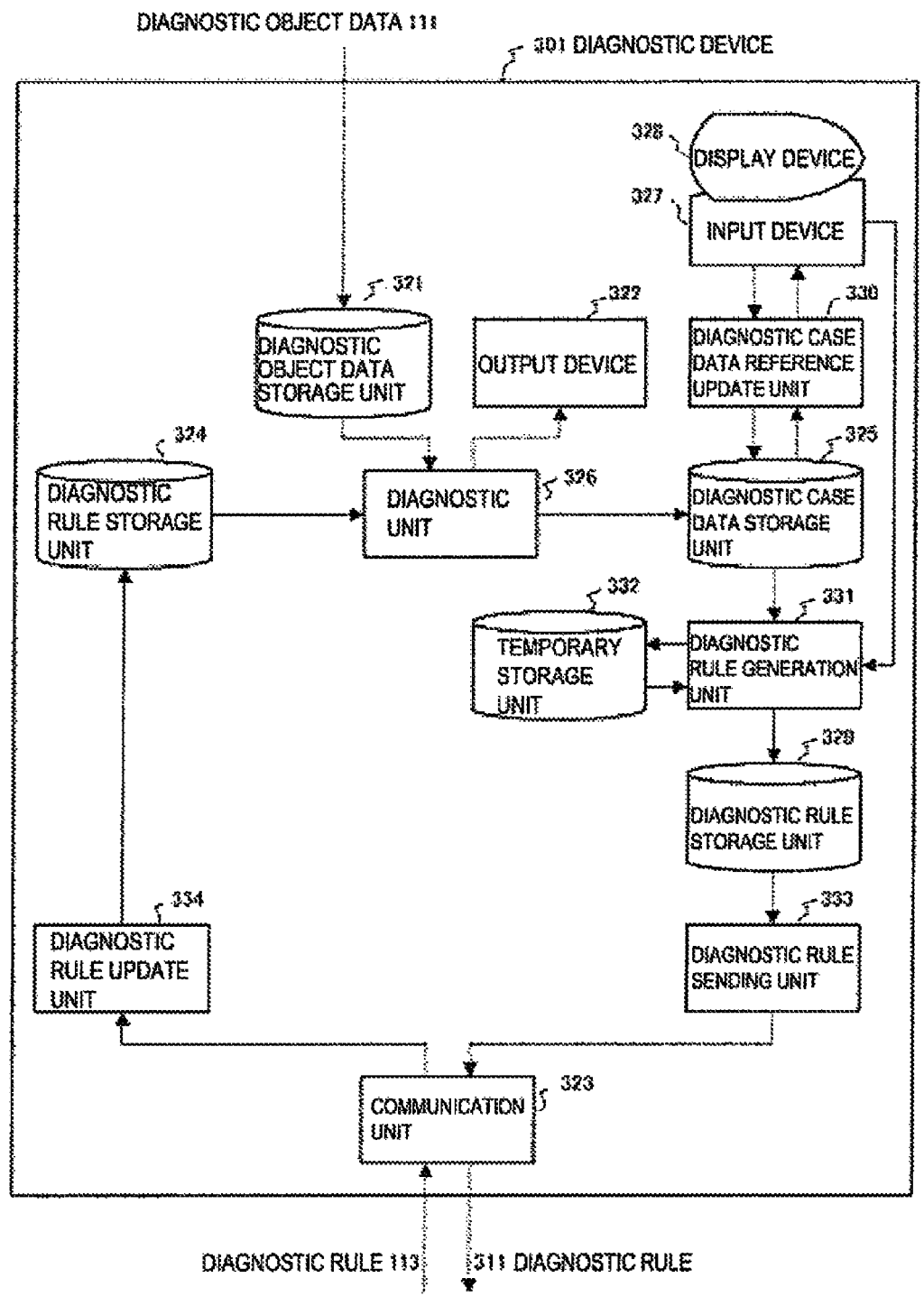
FIG. 11 is a block diagram showing a diagnostic device of the diagnostic system in the third exemplary embodiment of the present invention.

Referring to FIG. 11, the diagnostic device 301 comprises a diagnostic object data storage unit 321 that stores the diagnostic object data 111 measured on the diagnostic object 104; an output device 322 such as a display device; communication unit 323 that sends and receives the diagnostic rule 311 and the diagnostic rule 113 to and from the diagnostic rule generation device 302 via cable or wirelessly over the network 103; a diagnostic rule storage unit 324 that stores the diagnostic rule used for the diagnosis; a diagnostic case data storage unit 325 that stores diagnostic case data including diagnostic object data and its diagnostic result; a diagnostic unit 326 that diagnoses the diagnostic object 104 by applying the diagnostic rule, read from the diagnostic rule storage unit 324, to diagnostic object data, read from the diagnostic object data storage unit 321, outputs its diagnostic result to the output device 322 and, at the same time, saves the diagnostic case data, including the diagnostic object data and its diagnostic result, in the diagnostic case data storage unit 325; an input device 327 such as a keyboard; a display device 328 such as a liquid crystal display; a diagnostic rule storage unit 329 that stores the diagnostic rule generated by the device itself; a diagnostic case data reference update unit 330 that displays the diagnostic case data, stored in the diagnostic case data storage unit 325, on the display device 328 and updates the diagnostic case data according to an input from the input device 327; a diagnostic rule generation unit 331 that generates a diagnostic rule based on the diagnostic case data, stored in the diagnostic case data storage unit 325, and stores the generated diagnostic rule in the diagnostic rule storage unit 329; a temporary storage unit 332 that temporarily stores diagnostic case data used by the diagnostic rule generation unit 331 that generates a diagnostic rule; a diagnostic rule sending unit 333 that reads the diagnostic rule from the diagnostic rule storage unit 329 and sends the diagnostic rule to the diagnostic rule generation device 302 via the communication unit 323 over the network 103; and a diagnostic rule update unit 334 that receives the diagnostic rule 113, received from the diagnostic rule generation device 302, from the communication unit 323 and updates the diagnostic rule storage unit 324. Note that the output device 322 and the display device 328 may be combined into one device.

Figure 12:
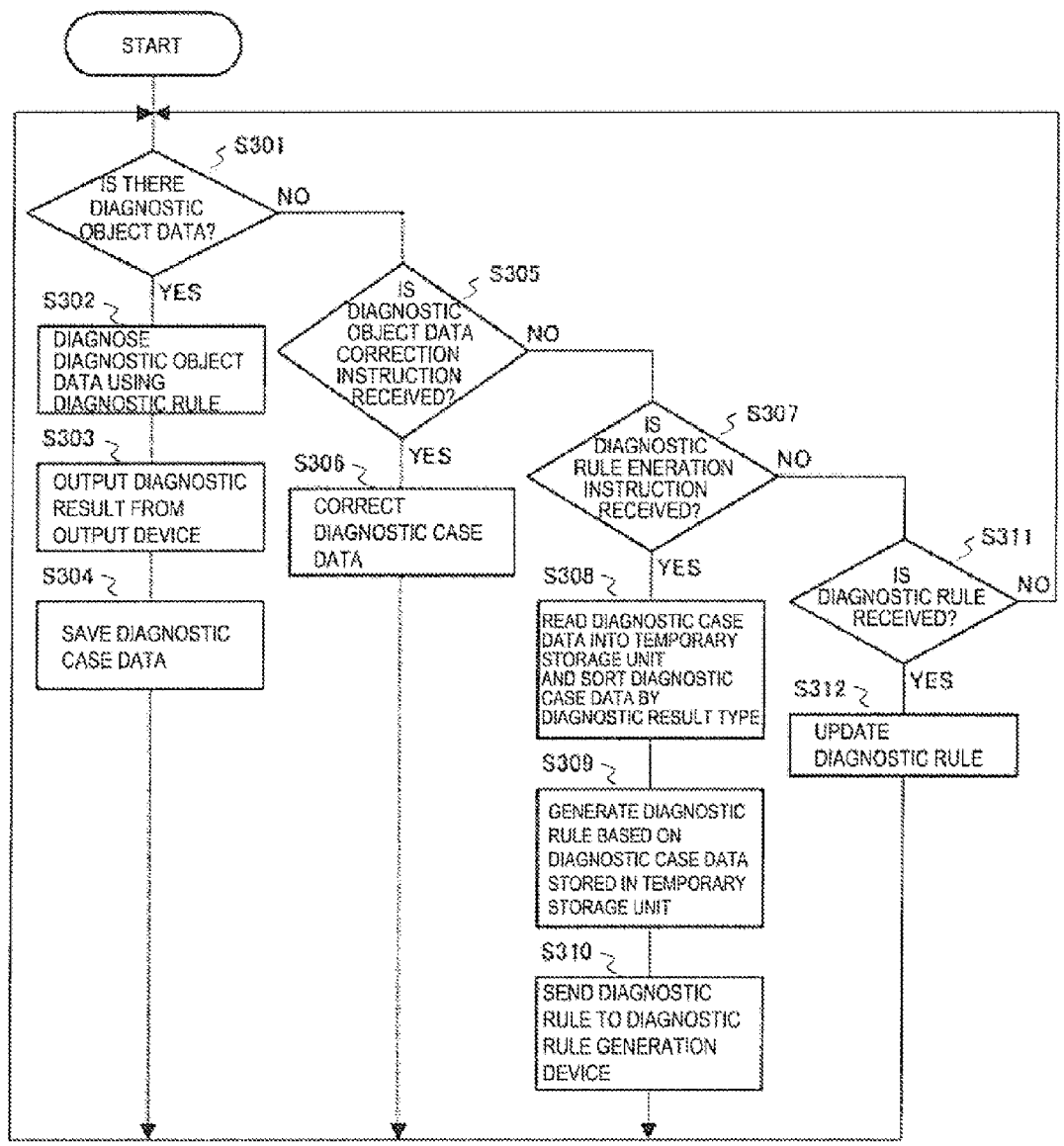
FIG. 12 is a flowchart showing an example of processing of the diagnostic device of the diagnostic system in the third exemplary embodiment of the present invention.

Next, the following describes the operation of the diagnostic device 301 with reference to FIG. 12.

The diagnostic object data 111 measured on the diagnostic object 104 is input to the corresponding diagnostic device 301 and is accumulated in the diagnostic object data storage unit 321 in the diagnostic device 301 with a unique data number assigned if the diagnostic object data storage unit 321 stores unprocessed diagnostic object data 111 (YES in S301), the diagnostic unit 326 of the diagnostic device 301 reads the unprocessed diagnostic object data 111 from the diagnostic object data storage unit 321, and applies the diagnostic rule, stored in the diagnostic rule storage unit 324, to the diagnostic object data 111 that diagnoses the diagnostic object data 111 (S302). Next, the diagnostic unit 326 outputs the diagnostic result from the output device 322 (S303) and, at the same time, saves the diagnostic case data, including the diagnostic object data 111 and its diagnostic result, in the diagnostic case data storage unit 325 (S304). The format of diagnostic case data is, for example, the same format that is used in the first exemplary embodiment shown in FIG. 4. The diagnostic results are, for example, information indicating that a fault occurred, the diagnostic result indicating its estimated cause, and information indicating that there is no fault and the operation is normal. The diagnostic result may be output only when an abnormal condition is detected by the diagnosis or may be output also when the condition is normal.

The diagnostic case data reference update unit 330 of the diagnostic device 301 displays the diagnostic case data, saved in the diagnostic case data storage unit 325, on the screen of the display device 328. If the user enters an input from the input device 327 onto the screen to change the diagnostic case data (YES in S305), the diagnostic case data reference update unit 330 rewrites the original data, stored in the diagnostic case data storage unit 325, with the changed data (S306). The user changes the diagnostic case data based on the user's expertise, an experiment result, a simulation result, and so on. For example, if the diagnostic object data in the diagnostic case data indicates only the diagnostic result indicating that fault A has occurred and if a later analysis of the diagnostic object data shows that the cause is a1, the user adds the cause a1 to the diagnostic result in the diagnostic case data. If it is confirmed the diagnostic case data, which has been diagnosed as normal, includes fault B not detectable by the current diagnostic rule, the user rewrites the diagnostic result in the diagnostic case data from normal to fault B.

When the usage range of diagnostic case data is specified from the input device 327 to instruct the generation of a diagnostic rule (YES in S307), the diagnostic rule generation unit 331 of the diagnostic device 301 reads the diagnostic case data in the specified usage range from the diagnostic case data storage unit 325, stores the diagnostic case data, which has been read, in the temporary storage unit 332, and sorts the diagnostic case data by diagnostic result type (S308). In this case, the same diagnostic result refers to the diagnostic results that contain the same contents; for example, the diagnostic results contain information that fault A was caused by cause a1 or that the operation was normal.

Next, the diagnostic rule generation unit 331 generates a diagnostic rule, used for estimating the state of the diagnostic object, from the diagnostic object data based on the diagnostic case data stored in the temporary storage unit 332 and sorted by diagnostic result, and stores the generated diagnostic rule in the diagnostic rule storage unit 329 (S309). The diagnostic rule generation method may be any method described in the first exemplary embodiment. Note that, because the number of pieces of diagnostic case data on the diagnostic object 104 is sometimes not enough as the number of pieces of diagnostic case data on an abnormal condition, it is desirable that the diagnostic rule be generated using diagnostic case data on normal conditions. More specifically, a statistical distribution (for example, contaminated normal distribution) is generated by learning from the diagnostic object data, included in the diagnostic case data diagnosed as normal, as described in Patent Document 3, and the sufficient statistic of the statistical distribution (for example, the average and variance when the distribution is a normal distribution) is used for the diagnostic rule. In this case, an actual diagnosis is made based on the anomaly score (for example, log-loss or Hellinger score) of the diagnostic object data 111 calculated from the diagnostic rule (statistical distribution). Instead of a statistical distribution, it is also possible to use a method for determining if data belongs to a diagnostic object event by means of a one-class support vector machine as described in Patent Document 4.

When the diagnostic rule generation unit 331 finishes the generation of the diagnostic rule, the diagnostic rule sending unit 333 reads the diagnostic rule from the diagnostic rule storage unit 329 and, with the number of this device assigned, sends the diagnostic rule to the diagnostic rule generation device 302 via the communication unit 323 over the network 103 (S310).

When the communication unit 323 receives the diagnostic rule 113 sent from the diagnostic rule generation device 302 (YES in S311), the diagnostic rule update unit 334 of the diagnostic device 301 receives the diagnostic rule 113 and updates the diagnostic rule stored in the diagnostic rule storage unit 324 (S312). The diagnostic rule is updated by replacing the original diagnostic rule with a diagnostic rule received immediately before or by adding the difference.

Figure 13:
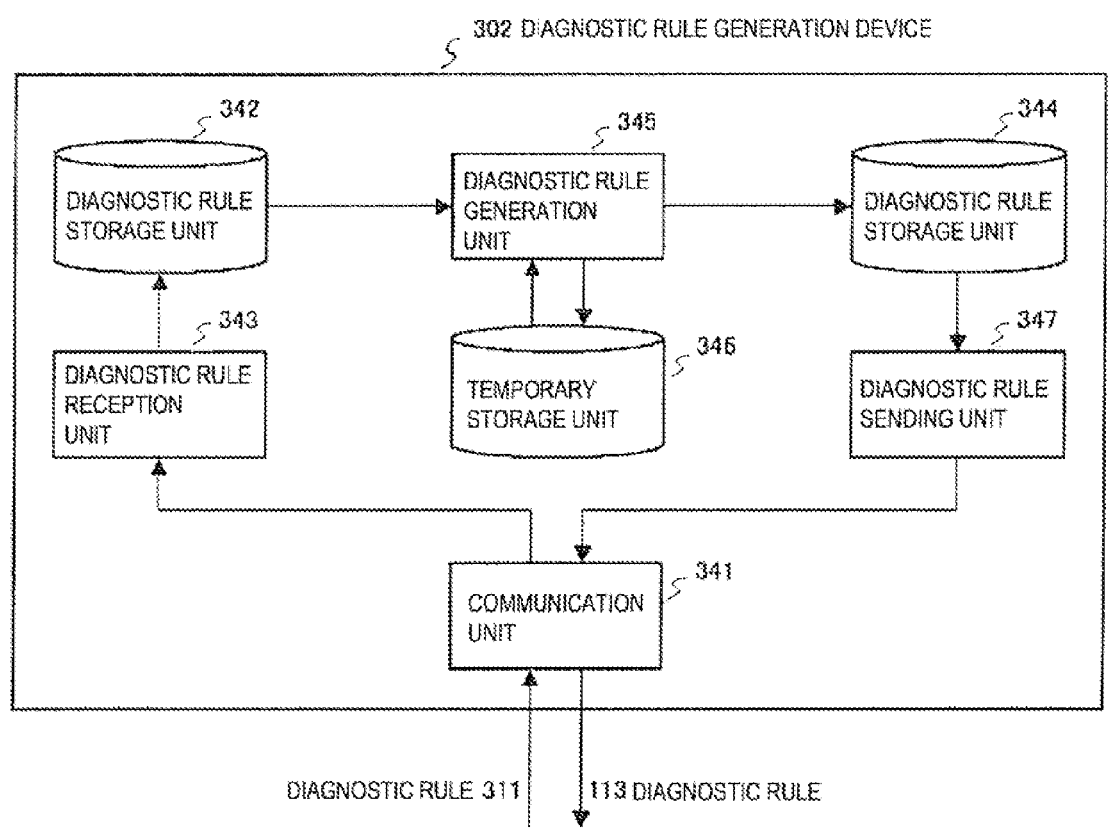
FIG. 13 is a block diagram showing a diagnostic rule generation device of the diagnostic system in the third exemplary embodiment of the present invention.

Referring to FIG. 13, the diagnostic rule generation device 302 comprises a communication unit 341 that sends or receives the diagnostic rules 311 and the diagnostic rule 113 to and from the diagnostic devices 301 via cable or wirelessly over the network 103; a diagnostic rule storage unit 342 that stores diagnostic rules received from the diagnostic devices 301; a diagnostic rule reception unit 343 that stores the diagnostic rules, received from the diagnostic devices 301, into the diagnostic rule storage unit 342; a diagnostic rule storage unit 342 that stores a diagnostic rule generated by the device itself; diagnostic rule generation unit 345 that generates a diagnostic rule by integrating the diagnostic rules of the diagnostic devices 301 stored in the diagnostic rule storage unit 342 and stores the generated diagnostic generated by own device rule in the diagnostic rule storage unit 344; a temporary storage unit 346 that temporarily stores the diagnostic rules of the diagnostic devices 301 used by the diagnostic rule generation unit 345 that generates a diagnostic rule; and a diagnostic rule sending unit 347 that reads the diagnostic rule from the diagnostic rule storage unit 344 and sends the diagnostic rule, which has been read, to the diagnostic devices 301 via the communication unit 341 over the network 103. The diagnostic rule generation device 302 may further comprise diagnostic rule reference update unit that displays the diagnostic rules, stored in the diagnostic rule storage unit 342, on the display device and corrects the diagnostic rules according to an input from the input device.

Figure 14:
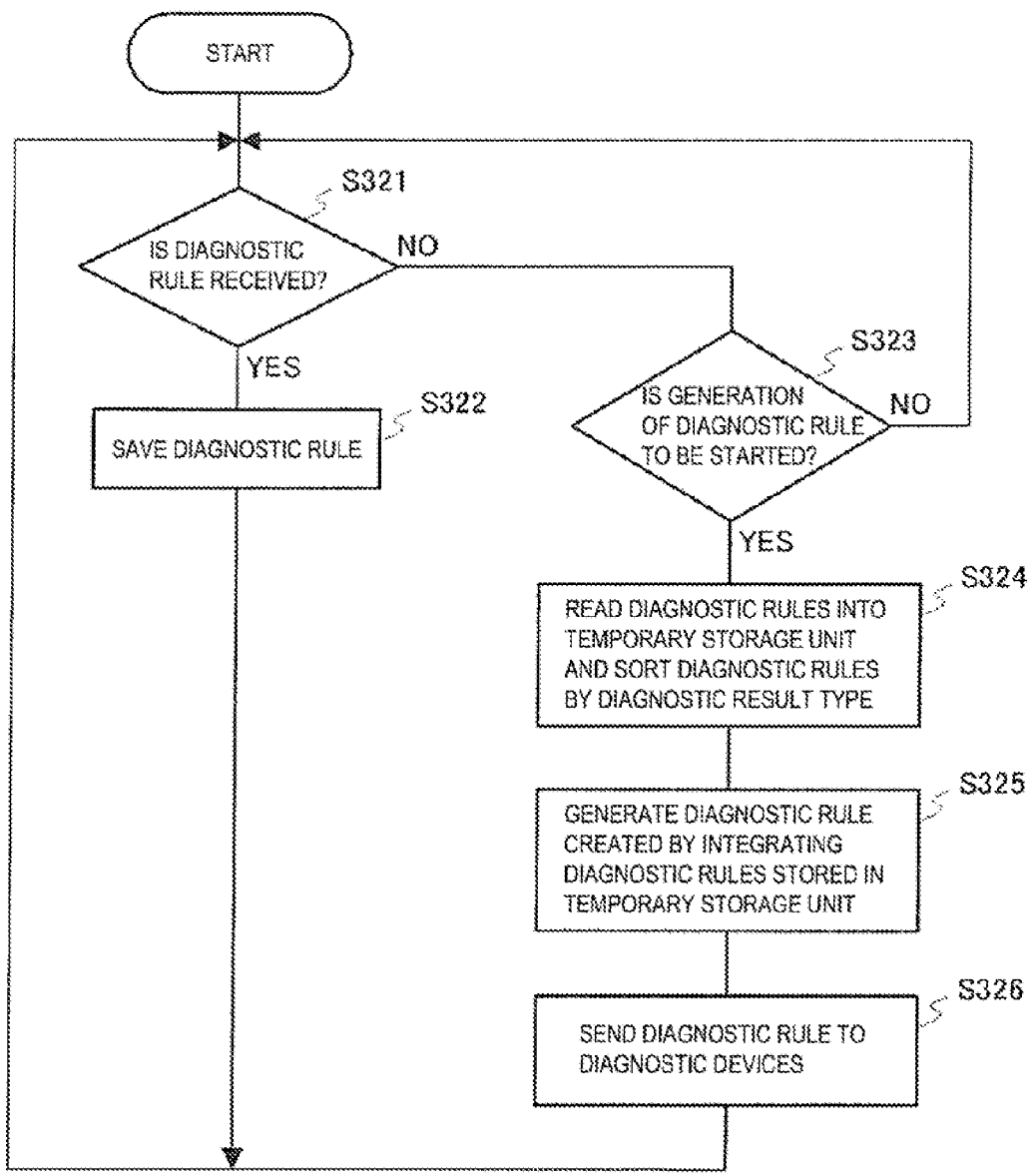
FIG. 14 is a flowchart showing an example of processing of the diagnostic rule generation device of the diagnostic system in the third exemplary embodiment of the present invention.

Next, the following describes the operation of the diagnostic rule generation device 302 with reference to FIG. 14.

When a diagnostic rule is received from one of the diagnostic devices 301 (YES in S321), the diagnostic rule reception unit 343 of the diagnostic rule generation device 302 saves the received diagnostic rule in the diagnostic rule storage unit 342 (S322).

Figure 15:
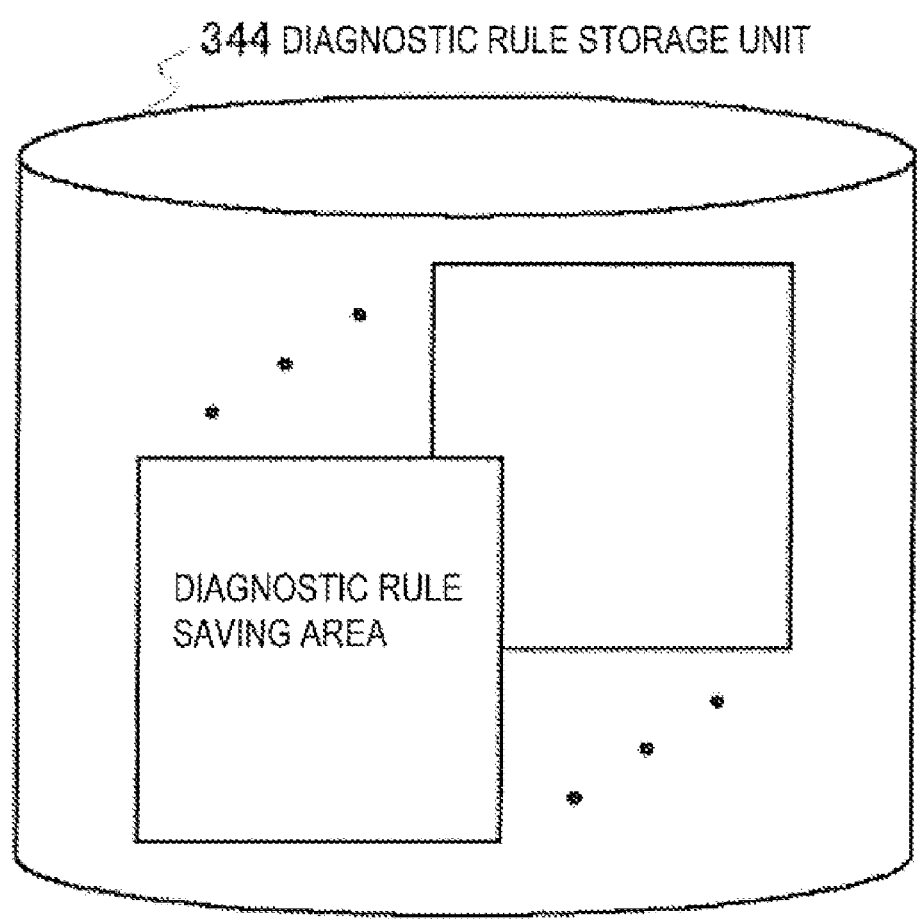
FIG. 15 is a diagram showing a diagnostic rule storage unit of the diagnostic rule generation device of the diagnostic system in the third exemplary embodiment of the present invention.

Referring to FIG. 15, the diagnostic rule storage unit 342 has diagnostic rule saving areas, one for the device number of each diagnostic device 301. The diagnostic rule reception unit 343 saves the received diagnostic rule into the diagnostic rule saving area having the same device number as that attached to the received diagnostic rule.

When the diagnostic rules of at least a predetermined number of diagnostic devices 301 are accumulated in the diagnostic rule storage unit 342 or an instruction to generate a diagnostic rule is entered by the user from an input device not shown (YES in S323), the diagnostic rule generation unit 345 of the diagnostic rule generation device 302 reads diagnostic rules from the diagnostic rule storage unit 342, stores the diagnostic rules in the temporary storage unit 346, and sorts them by diagnostic result type (S324). This operation collects the diagnostic rules, generated by multiple diagnostic devices 301 and used to derive the same diagnostic result, into one location. In this case, the diagnostic rules used to derive the same diagnostic result refer, for example, to the diagnostic rules used to derive the diagnostic result indicating that fault A was caused by cause a1 or the diagnostic rules used to derive the diagnostic result indicating that the operation was normal.

Next, the diagnostic rule generation unit 345 generates a (integrated) diagnostic rule, which is created by integrating the diagnostic rules stored in the temporary storage unit 346 and classified by diagnostic result, and stores the generated diagnostic rule in the diagnostic rule storage unit 344 (S325). The diagnostic rule generation method depends on the diagnostic rule type. The following gives some examples.

For example, when the diagnostic rule is a contaminated normal distribution, each diagnostic device 301 generates a sufficient statistic (average and variance of each normal distribution and mixture rate) of the contaminated normal distribution from the diagnostic case data and sends the sufficient statistic to the diagnostic rule generation device 302 as the diagnostic rule 311. And, from the sufficient statistic of the contaminated normal distribution generated by each diagnostic device 301, the diagnostic rule generation device 302 generates the diagnostic rule 113. Most simply, the diagnostic rule generation device 302 simply adds up the contaminated normal distributions received from the diagnostic devices 301 to standardize the mixture rate. Another method is that, considering the probabilistic complexity of contaminated normal distributions, the normal distributions are merged to reconfigure a contaminated normal distribution composed of an appropriate number of distributions. A still another method is that data is sampled from each contaminated normal distribution to regenerate a contaminated normal distribution from all data.

When pattern matching is used for the diagnosis, each diagnostic device 301 generates reference patterns, one for each event such as the type of an abnormal condition and the type of its cause, from the diagnostic case data as a diagnostic rule and sends the generated reference patterns to the diagnostic rule generation device 302. When reference patterns of the same event are received from multiple diagnostic devices 301, the diagnostic rule generation device 302 generates a new reference pattern from those reference patterns. More specifically, if a pattern is represented by real numbers, all those real numbers may be generated as a reference pattern related to the event or a reference pattern related to the event may be generated by the simple average or weighted average of those real numbers. If a pattern is represented by binary numbers, a reference pattern is generated by the logical operation such as AND, OR, or exclusive OR.

For other types of diagnostic rule, the diagnostic rules obtained by multiple diagnostic devices 301 through learning may be used to generate a single diagnostic rule, or the ensemble learning technique, such as boosting, may also be used to generate a new diagnostic rule by combining diagnostic rules.

When the diagnostic rule generation unit 345 finishes the generation of the diagnostic rule, the diagnostic rule sending unit 347 reads the diagnostic rule from the diagnostic rule storage unit 344 and sends it to all diagnostic devices 301 via the communication unit 341 over the network 103 (S326). This allows the diagnostic device 301 to update the existing diagnostic rule with the received diagnostic rule as described above.

Next, the following describes the effect of this exemplary embodiment.

In this exemplary embodiment, a diagnostic rule may be updated based on various types of case data. The reason is that each of N diagnostic devices 301, which diagnose the same type of diagnostic object 104, generates a diagnostic rule from its own diagnostic case data and that the diagnostic rule generation device 302 generates a diagnostic rule by integrating those multiple diagnostic rules.

In this exemplary embodiment, the existing diagnostic rule of the diagnostic devices 301 may be updated remotely with a diagnostic rule generated based on the collected case data. The reason is that multiple diagnostic devices 301 and the diagnostic rule generation device 302 are connected via the network 103 and that a diagnostic rule, generated by the diagnostic rule generation device 302, is sent to the diagnostic devices 301 via the network that updates the diagnostic rules of the diagnostic devices 301.

In this exemplary embodiment, not diagnostic case data but a diagnostic rule generated from the diagnostic case data is sent from the diagnostic device 301 to the diagnostic rule generation device 302. Therefore, as compared with the first exemplary embodiment, the amount of communication between the diagnostic device 301 and the diagnostic rule generation device 302 may be reduced.

Fourth Exemplary Embodiment

In the exemplary embodiments described above, processing for sensing a fault in a diagnostic object and estimating its cause is performed all by a diagnostic device included in or connected to the diagnostic object. In contrast, in this exemplary embodiment, a diagnostic device included in or connected to a diagnostic object makes a simplified diagnosis for sensing a fault in a diagnostic object, and a detailed diagnostic device installed in the center makes a detailed diagnosis based on a diagnostic rule. The diagnostic rule is updated by the case data of the detailed diagnosis.

Figure 16:
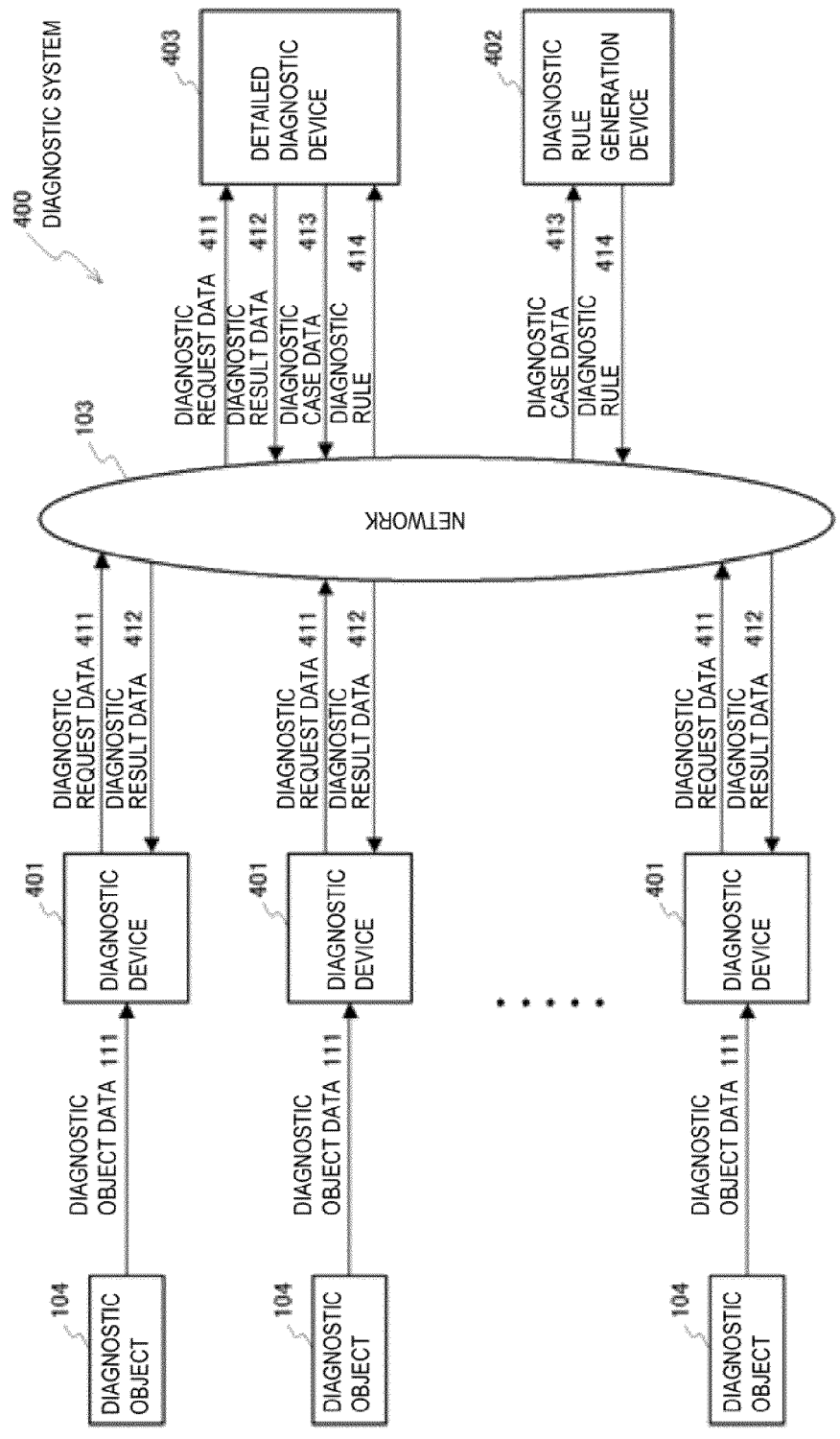
FIG. 16 is a block diagram showing a diagnostic system in a fourth exemplary embodiment of the present invention.

Referring to FIG. 16, a diagnostic system 400 in a fourth exemplary embodiment of the present invention comprises $N(\geq 2)$ diagnostic devices 401, one diagnostic rule generation device 402, and a detailed diagnostic device 403 that are connected via a network 103, similar to the one in the first exemplary embodiment, for mutual communication.

Each diagnostic device 401 has the function to sense an abnormal condition in a diagnostic object 104 based on received diagnostic object data 111. The diagnostic device 401 also has the function to send diagnostic request data 411, which includes the diagnostic object data 111 in a fixed period including a point in time at which the abnormal condition was detected, to the detailed diagnostic device 403 over the network 103 and to receive and output diagnostic result data 412 that is a response to the diagnostic request data.

The detailed diagnostic device 403 has the function to make a detailed diagnosis of the diagnostic request data 411, received from each diagnostic device 401, using a diagnostic rule and to send the diagnostic result data 412 to the requesting diagnostic device, the function to send diagnostic case data 413, which includes the diagnostic object data to be diagnosed and its diagnostic result, to the diagnostic rule generation device 402, and the function to update the diagnostic rule, stored in the device itself, with the diagnostic rule received from the diagnostic rule generation device 402.

The diagnostic rule generation device 402 is the same as the diagnostic rule generation device 102 used in the first and second exemplary embodiments. They are different in that the diagnostic rule generation device 102 receives diagnostic case data from diagnostic devices and sends the generated diagnostic rule to the diagnostic devices, whereas the diagnostic rule generation device 402 in this exemplary embodiment receives diagnostic case data from the detailed diagnostic device 403 and sends the generated diagnostic rule to the detailed diagnostic device 403.

The general operation of the diagnostic system 400 in this exemplary embodiment, which is configured as described above, is as follows.

Each diagnostic device 401 receives the diagnostic object data 111 measured on the diagnostic object 104 corresponding to the diagnostic device and, based on the received diagnostic object data 111, senses if an abnormal condition is generated in the diagnostic object 104. If an abnormal condition is sensed, the diagnostic device 401 sends the diagnostic request data 411, which includes the diagnostic object data 111, to the detailed diagnosis device 403 over the network 103.

When the diagnostic request data 411 is received from one of the diagnostic devices 401, the detailed diagnostic device 403 uses the diagnostic rule, held in the device itself, to make a detailed diagnosis and sends the diagnostic result data 412 to the requesting diagnostic device 401. When the diagnostic result data 412 is received, the requesting diagnostic device 401 outputs it from the output device. At the same time, the detailed diagnostic device 403 sends the diagnostic case data 413, which includes the diagnostic request data, included in the diagnostic request data 411, and its diagnostic result, to the diagnostic rule generation device 402.

The diagnostic rule generation device 402 accumulates therein the diagnostic case data 413 received from the detailed diagnostic device 403. When the number of pieces of diagnostic case data 413 required that generates a rule is accumulated, the diagnostic rule generation device 402 generates a diagnostic rule 414 from the diagnostic case data and sends the generated diagnostic rule 414 to the detailed diagnostic device 403 over the network 103.

The detailed diagnostic device 403 updates the diagnostic rule, stored in the device itself, with the diagnostic rule received from the diagnostic rule generation device 402. From this time on, the detailed diagnostic device 403 uses the updated diagnostic rule to diagnose the diagnostic request data 411 received from the diagnostic device 401.

The following describes the diagnostic device 401 and the detailed diagnostic device 403 in detail.

Figure 17:
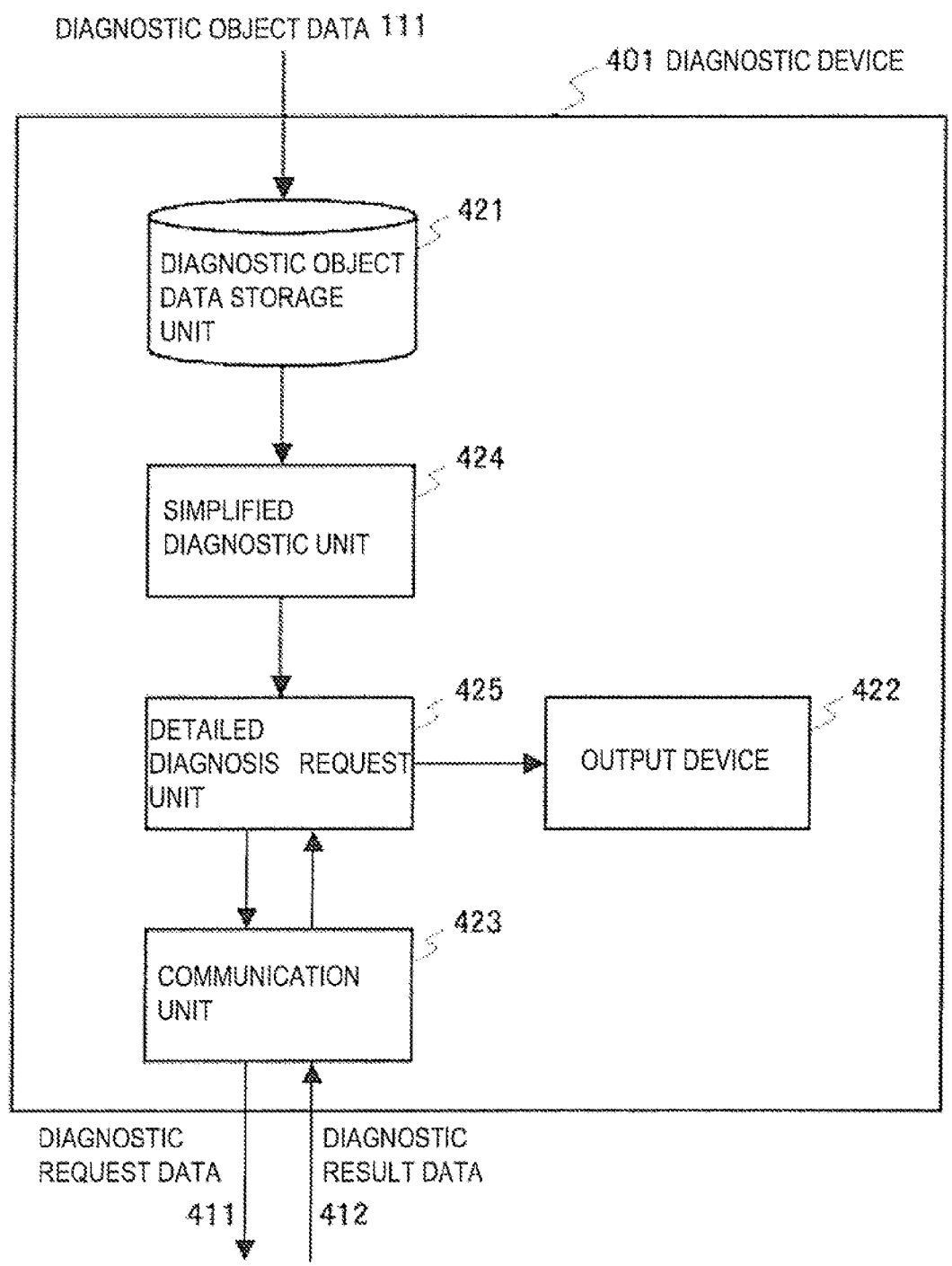
FIG. 17 is a block diagram showing a diagnostic device of the diagnostic system in the fourth exemplary embodiment of the present invention.

Referring to FIG. 17, the diagnostic device 401 comprises a diagnostic object data storage unit 421 that stores the diagnostic object data 111 measured on the diagnostic object 104; an output device 422 such as a display device; a communication unit 423 that sends and receives the diagnostic request data 411 and the diagnostic result data 412 to and from the detailed diagnostic device 403 via cable or wirelessly over the network 103; a simplified diagnostic unit 424 that makes a simplified diagnosis for the diagnostic object data, read from the diagnostic object data storage unit 421, for sensing if a fault is generated; and a detailed diagnosis request unit 425 that sends the diagnostic request data 411, which includes diagnostic object data in a fixed period including the point in time at which the generation of a fault was sensed by the simplified diagnostic unit 424, to the detailed diagnostic device 403 via the communication unit 423 over the network 103 and, when the diagnostic result data 412, which is the response to the diagnostic request data 411, is received from the communication unit 423, outputs the response to the output device 422.

In this exemplary embodiment, the simplified diagnostic unit 424 uses the same unit as the abnormal-time estimation unit 203 used in the second exemplary embodiment. That is, the simplified diagnostic unit 424 detects if the diagnostic object data is data at a time series change point or an outlier of a data distribution and, if the diagnostic object data is data at a time series change point or an outlier of a data distribution, judges that an abnormal condition has occurred.

Figure 18:
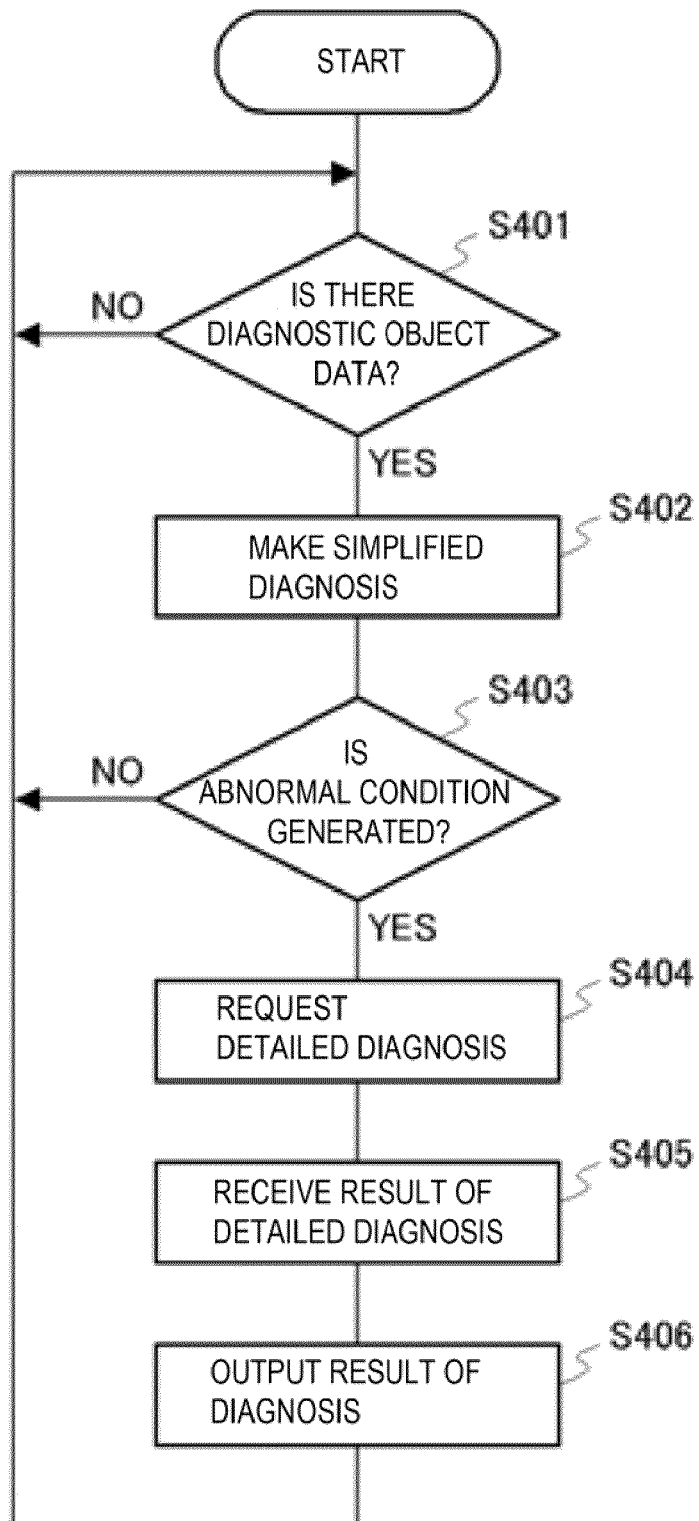
FIG. 18 is a flowchart showing an example of processing of the diagnostic device of the diagnostic system in the fourth exemplary embodiment of the present invention.

Next, the following describes the operation of the diagnostic device 401 with reference to FIG. 18.

The diagnostic object data 111 measured on the diagnostic object 104 is input to the corresponding diagnostic device 401 and is accumulated in the diagnostic object data storage unit 421 of the diagnostic device 401 with a unique data number assigned. If the diagnostic object data storage unit 421 stores unprocessed diagnostic object data 111 (YES in S401), the simplified diagnostic unit 424 of the diagnostic device 401 reads the unprocessed diagnostic object data 111 from the diagnostic object data storage unit 421 and makes a simplified diagnosis for sensing if an abnormal condition has occurred (S402).

If an abnormal condition is sensed as a result of the simplified diagnosis (YES in S403), the detailed diagnosis request unit 425 generates the diagnostic request data 411 that includes either the diagnostic object data 111 at an abnormal condition sensing time or the diagnostic object data 111 at an abnormal condition sensing time and diagnostic object data in a fixed period of time before and after the abnormal condition sensing time. The detailed diagnosis request unit 425 adds the number of the diagnostic device 401 to the diagnostic request data 411 and sends it to the detailed diagnostic device 403 via the communication unit 423 over the network 103 (S404). The detailed diagnosis request unit 425 waits for a response from the detailed diagnostic device 403 and, when the diagnostic result data 412 responsive to the diagnostic request data 411 is received via the network 103 (S405), receives the diagnostic result data 412 from the communication unit 423, and outputs the diagnostic result, included in the diagnostic result data 412, to the output device 422 (S406).

Figure 19:
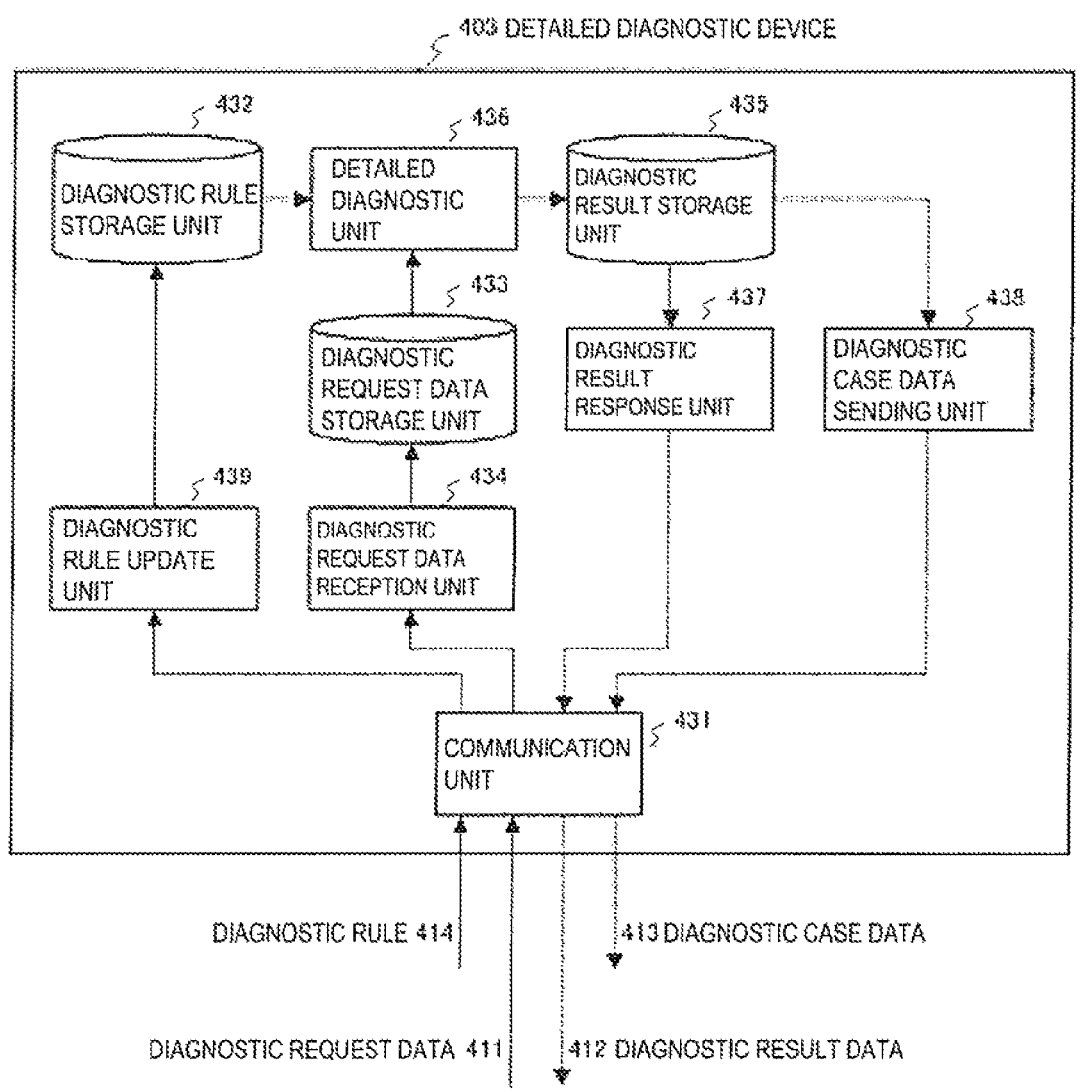
FIG. 19 is a block diagram showing a detailed diagnostic device of the diagnostic system in the fourth exemplary embodiment of the present invention.

Referring to FIG. 19, the detailed diagnostic device 403 comprises a communication unit 431 that sends and receives the diagnostic request data 411 and the diagnostic result data 412 to and from the diagnostic device 401 and sends and receives the diagnostic case data 413 and the diagnostic rule 414 to and from the diagnostic rule generation device 402; a diagnostic rule storage unit 432 that stores a diagnostic rule; a diagnostic request data storage unit 433 that stores the diagnostic request data received from the diagnostic devices 401; a diagnostic request data reception unit 434 that stores the diagnostic request data, received from the diagnostic devices 401, in the diagnostic request data storage unit 433; a diagnostic result storage unit 435 that stores the result of the detailed diagnosis; a detailed diagnostic unit 436 that diagnoses diagnostic object data by applying the diagnostic rule, stored in the diagnostic rule storage unit 432, to the diagnostic request data stored in the diagnostic request data storage unit 433 and stores the diagnostic request data and the diagnostic result, with correspondence established between them, in the diagnostic result storage unit 435; a diagnostic result response unit 437 that reads the diagnostic result, corresponding to the diagnostic request data, from the diagnostic result storage unit 435 and sends the diagnostic result data 412 to the requesting diagnostic device 401 via the communication unit 431; a diagnostic case data sending unit 438 that reads diagnostic request data and the corresponding diagnostic result from the diagnostic result storage unit 435, generates the diagnostic case data 413 with the format in the first exemplary embodiment described in FIG. 4, and sends the generated diagnostic case data 413 to the diagnostic rule generation device 402 via the communication unit 431 over the network 103; and a diagnostic rule update unit 439 that updates the diagnostic rule storage unit 432 with the diagnostic rule received from the diagnostic rule generation device 402.

Figure 20:
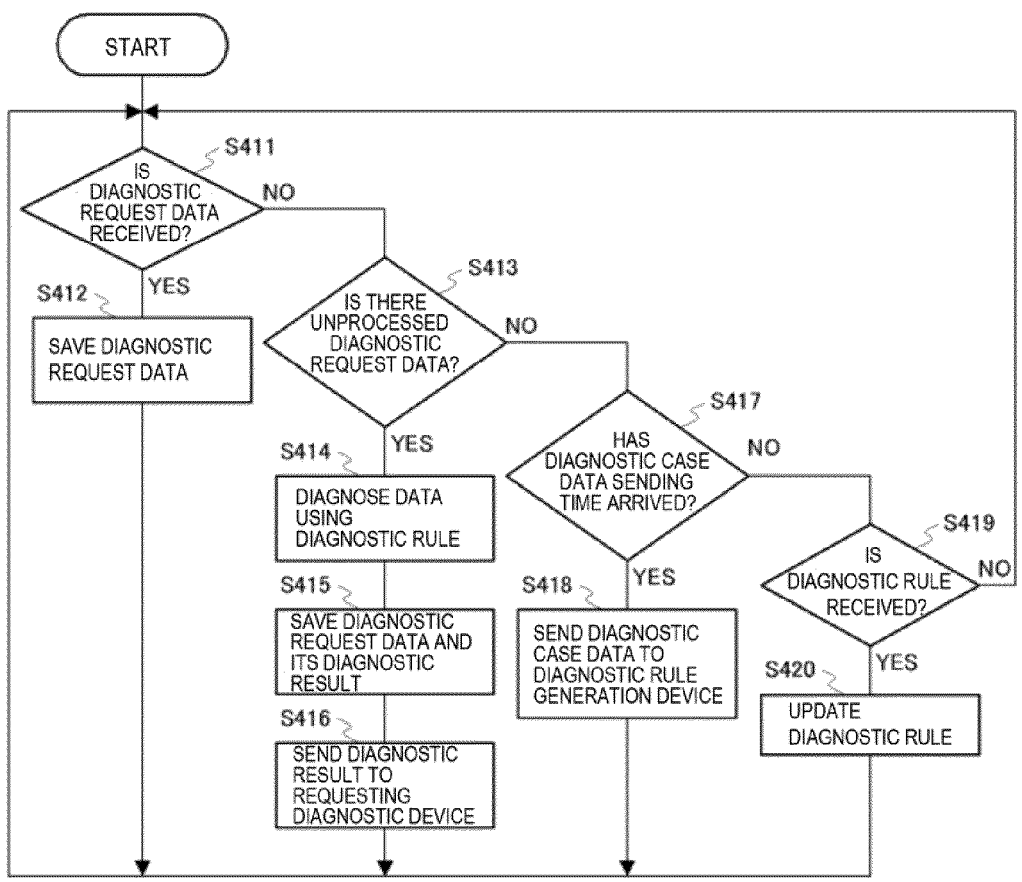
FIG. 20 is a flowchart showing an example of processing of the detailed diagnostic device of the diagnostic system in the fourth exemplary embodiment of the present invention.

Next, the following describes the operation of the detailed diagnostic device 403 with reference to FIG. 20.

When the diagnostic request data 411 is received from one of the diagnostic devices 401 (YES in S411), the diagnostic request data reception unit 434 of the detailed diagnostic device 403 saves the received diagnostic request data 411 in the diagnostic request data storage unit 433 (S412). The diagnostic request data 411 includes the device number of the requesting diagnostic device 401, the diagnostic object data, and its data number.

If the diagnostic request data storage unit 433 stores unprocessed diagnostic request data (S413), the detailed diagnostic unit 436 of the detailed diagnostic device 403 reads this diagnostic request data and applies the diagnostic rule, stored in the diagnostic request data storage unit 433, to the diagnostic request data to diagnose it (S414). And, the detailed diagnostic unit 436 saves the diagnostic request data and its diagnostic result in the diagnostic result storage unit 435 with correspondence established between them (S415). Next, the diagnostic result response unit 437 reads the diagnostic request data and its diagnostic result from the diagnostic result storage unit 435 and sends the diagnostic result data 412 to the requesting diagnostic device 401 specified by the device number in the diagnostic request data (S416).

When a predetermined diagnostic case data sending time has arrived (YES in S417), the diagnostic case data sending unit 438 of the detailed diagnostic device 403 reads a set of diagnostic request data and its diagnostic result from the diagnostic result storage unit 435. For each set, the diagnostic case data sending unit 438 generates diagnostic case data, which includes the device number, data number, and diagnostic object data included in the diagnostic request data and the diagnostic result of the detailed diagnostic unit 436, and sends the generated diagnostic case data to the diagnostic rule generation device 402 via the communication unit 431 over the network 103 (S418). The sending time is the time at which the detailed diagnostic unit 436 writes the diagnostic result in the diagnostic result storage unit 435, the time after a predefined time interval has passed, or the time at which a fixed amount of diagnostic results has been saved.

When the diagnostic rule sent from the diagnostic rule generation device 402 is received by the communication unit 431 (S419), the diagnostic rule update unit 439 of the detailed diagnostic device 403 receives the diagnostic rule and updates the diagnostic rule stored in the diagnostic rule storage unit 432 (S420). The diagnostic rule is updated, for example, by replacing the original diagnostic rule with the latest diagnostic rule received immediately before or by adding the difference between the original diagnostic rule and the latest diagnostic rule.

Next, the following describes the effect of this exemplary embodiment.

In this exemplary embodiment, a diagnostic rule may be generated based on various types of case data. The reason is that a diagnostic rule is generated from diagnostic case data that includes diagnostic object data that the N diagnostic devices 401, which diagnose the diagnostic objects 104 of the same type, request the detailed diagnostic device 403 to make a diagnosis.

In this exemplary embodiment, the existing diagnostic rule of the detailed diagnostic device 403 may be remotely updated with a diagnostic rule generated based on the collected diagnostic case data. The reason is that the detailed diagnostic device 403 and the diagnostic rule generation device 402 are connected via the network 103 and that a diagnostic rule, generated by the diagnostic rule generation device 402, is sent to the detailed diagnostic device 403 via the network that updates the diagnostic rule of the detailed diagnostic device 403.

In this exemplary embodiment, each diagnostic device 401 does not require the detailed diagnostic function to diagnose the diagnostic object data 111. This configuration simplifies the configuration of the diagnostic device 401, allowing the diagnostic device 401 to be included easily into a compact diagnostic object 104 such as a mobile phone.

Fifth Exemplary Embodiment

Figure 21:
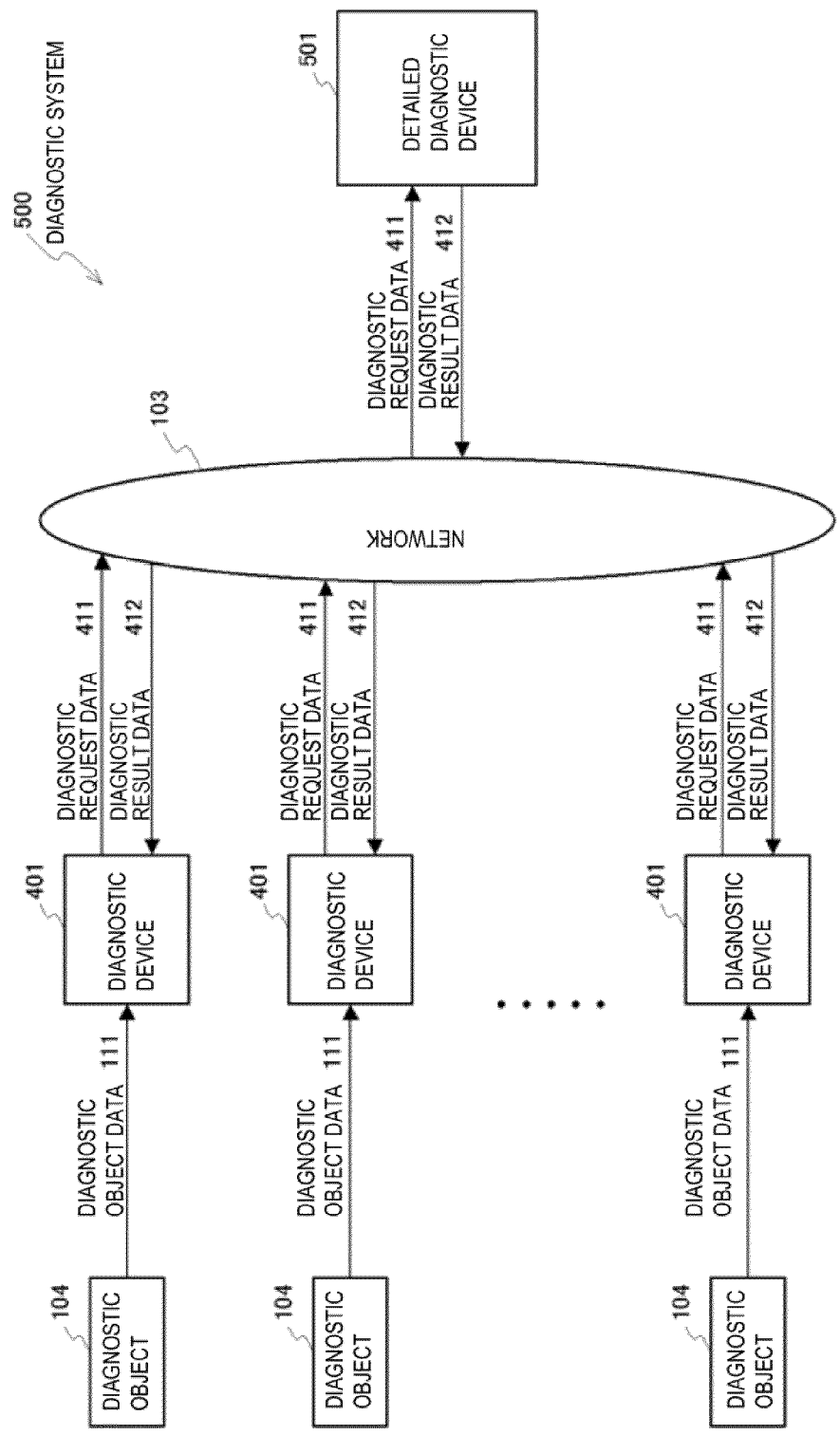
FIG. 21 is a block diagram showing a diagnostic system in a fifth exemplary embodiment of the present invention.

In the fourth exemplary embodiment, the detailed diagnostic device 403 and the diagnostic rule generation device 402 are implemented as independent devices. In contrast, in this exemplary embodiment, a detailed diagnostic device 501, which has both the function of the detailed diagnostic device 403 and the function of the diagnostic rule generation device 402, is connected to a network 103 as shown in FIG. 21. This exemplary embodiment is similar to the fourth exemplary embodiment except only in the detailed diagnostic device 501.

Figure 22:
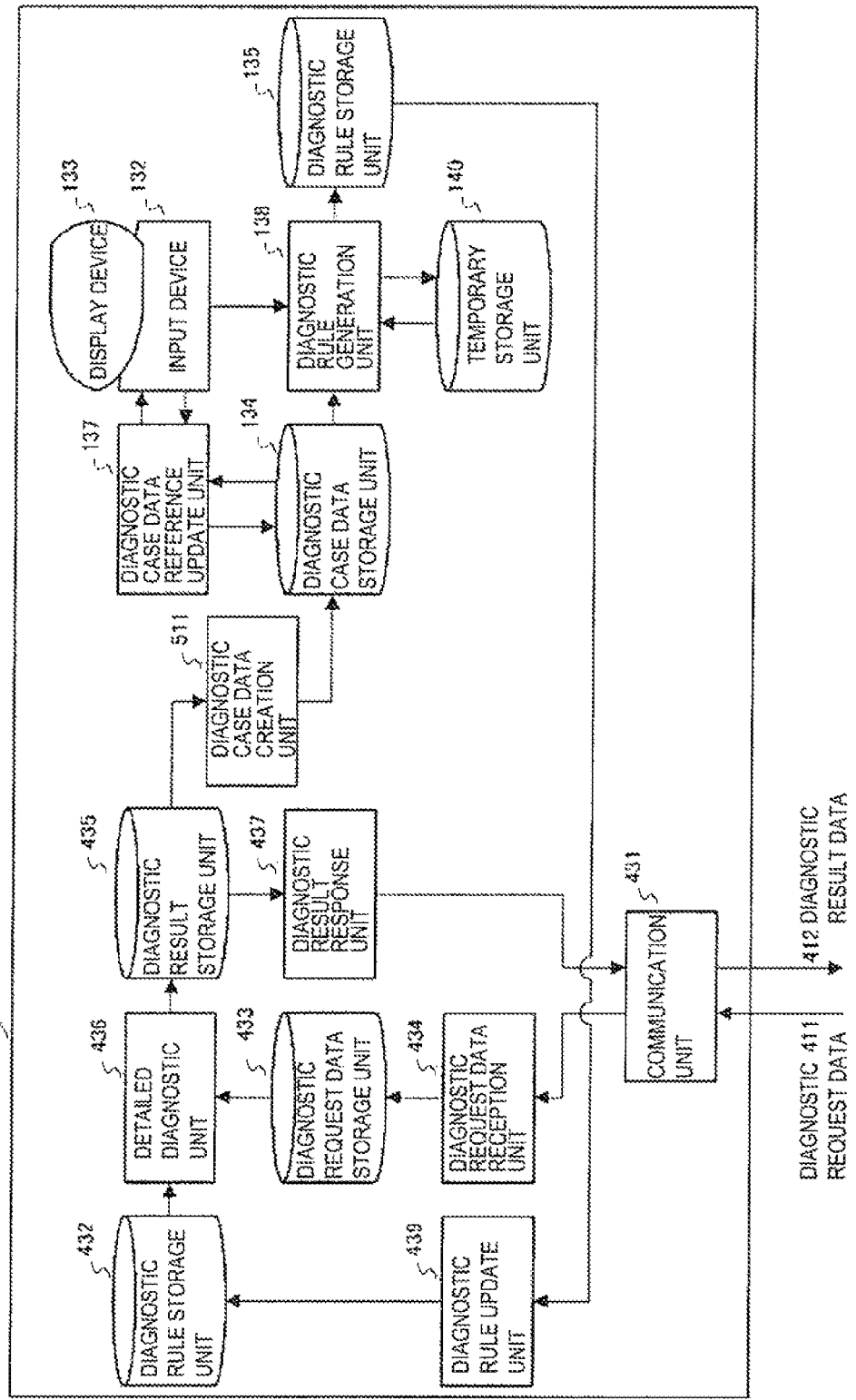
FIG. 22 is a block diagram showing a detailed diagnostic device of the diagnostic system in the fifth exemplary embodiment of the present invention.

Referring to FIG. 22, the detailed diagnostic device 501 comprises the same components as those of the detailed diagnostic device 403 in the fourth exemplary embodiment, that is, communication unit 431, diagnostic rule storage unit 432, diagnostic request data storage unit 433, diagnostic request data reception unit 434, diagnostic result storage unit 435, detailed diagnostic unit 436, diagnostic result response unit 437, and diagnostic rule update unit 439; the same components as those of the diagnostic rule generation device 402 in the fourth exemplary embodiment (that is, the diagnostic rule generation device 102 in the first exemplary embodiment), that is, input device 132, display device 133, diagnostic case data storage unit 134, diagnostic rule storage unit 135, diagnostic case data reference update unit 137, diagnostic rule generation unit 138, and temporary storage unit 140; and diagnostic case data creation unit 511 corresponding to the diagnostic case data sending unit 438 of the detailed diagnostic device 403 in the fourth exemplary embodiment.

The diagnostic case data creation unit 511 reads a set of diagnostic request data and its diagnostic result from the diagnostic result storage unit 435, generates diagnostic case data, which includes the device number, data number, and diagnostic object data included in the diagnostic request data and the diagnostic result of the detailed diagnostic unit 436, for each set, and saves the generated diagnostic case data in the diagnostic case data storage unit 134. The diagnostic rule update unit 439 reads the generated diagnostic rule from the diagnostic rule storage unit 135 and updates the diagnostic rule storage unit 432.

As described above, this exemplary embodiment comprises the detailed diagnostic device 501 that has the function of both the detailed diagnostic device 403 and the diagnostic rule generation device 402 in the fourth exemplary embodiment. This configuration prevents the diagnostic case data and the diagnostic rule from being sent and received over the network 103, thus reducing the communication load of the network 103.

Other Exemplary Embodiments

While the present invention has been described with reference to the exemplary embodiment above, it is to be understood that the present invention is not limited to the exemplary embodiments described above and that various additions and changes may be made. For example, the simplified diagnostic unit 424 of the diagnostic device 401 in the fourth and fifth exemplary embodiments may be unit that applies a diagnostic rule to the diagnostic object data 111 to sense a fault, and a new diagnostic rule, used to update the diagnostic rule, may be generated from the diagnostic case data, as with the diagnostic rule of the detailed diagnostic devices 403 and 501, and sent to the diagnostic devices 401 to update their diagnostic rules. The functions of the diagnostic device, diagnostic rule generation device, and detailed diagnostic device of the present invention may be implemented not only by hardware but also by a computer and programs. The programs, which are recorded in and distributed via a computer-readable recording medium such as a magnetic disk or a semiconductor memory, are read by a computer at computer startup time to control the operation of the computer for causing the computer to function as the diagnostic devices 101, 301, and 401, the diagnostic rule generation devices 102, 302, and 402, and the detailed diagnostic devices 403 and 501 in the exemplary embodiments described above.

The exemplary embodiments and the examples may be changed and adjusted in the scope of the entire disclosure (including claims and drawings) of the present invention and based on the basic technological concept thereof. In the scope of the claims of the present invention, various disclosed elements may be combined and selected in a variety of ways. The further objects, features or configurations, and effect of the present invention will become apparent in the entire disclosure (including claims and drawings).

What is claimed is:

1. A diagnostic system that diagnoses a diagnostic object by applying a diagnostic rule to diagnostic object data measured on the diagnostic object, wherein
a plurality of diagnostic devices, each of which diagnoses a diagnostic object, and a diagnostic rule generation device, which generates a diagnostic rule used for a diagnosis, are communicably connected;
diagnostic case data, which includes diagnostic object data measured on a diagnostic object and a diagnostic result thereof, is collected from a plurality of diagnostic objects and, based on the collected diagnostic case data, a new diagnostic rule for updating the diagnostic rule is generated;
said diagnostic system comprising:
a first diagnostic rule generation unit that generates a diagnostic rule based on the diagnostic case data that includes the diagnostic object data and the diagnostic result; and first diagnostic rule sending unit that sends the diagnostic rule, generated by said first diagnostic rule generation unit, to a diagnostic rule generation device, wherein
said diagnostic rule generation device comprises a second diagnostic rule generation unit that generates an integrated diagnostic rule from a plurality of diagnostic rules received from said plurality of diagnostic devices; and second diagnostic rule sending unit that sends the diagnostic rule, generated by said second diagnostic rule generation unit, to said diagnostic devices.

2. The diagnostic system as defined by claim 1, wherein
said diagnostic device comprises: a diagnostic rule storage unit that stores a diagnostic rule; a diagnostic unit that diagnoses a diagnostic object by applying the diagnostic rule to diagnostic object data measured on the diagnostic object and outputs a diagnostic result thereof from an output device; a diagnostic case data sending unit that sends diagnostic case data, which includes the diagnostic object data and the diagnostic result, to said diagnostic rule generation device; and a diagnostic rule update unit that updates said diagnostic rule storage unit with a diagnostic rule received from said diagnostic rule generation device; and
said diagnostic rule generation device comprises: a diagnostic rule generation unit that generates a diagnostic rule based on the diagnostic case data received from said plurality of diagnostic devices; and a diagnostic rule sending unit that sends the diagnostic rule, generated by said diagnostic rule generation unit, to said diagnostic devices.

3. The diagnostic system as defined by claim 2, wherein
said diagnostic device further comprises: an abnormal-time estimation unit that detects if the diagnostic object data is data at a time series change point or an outlier of a data distribution wherein said diagnostic case data sending unit sends the diagnostic case data in a fixed period, which includes a point in time at which a time series change point or an outlier of a data distribution was detected by said abnormal-time estimation unit, to said diagnostic rule generation device.

4. The diagnostic system as defined by claim 1, wherein
a plurality of first diagnostic devices each of which senses an abnormal condition of a diagnostic object, a second diagnostic device that diagnoses more in detail a state of the diagnostic object in which an abnormal condition was detected by said first diagnostic device, and a diagnostic rule generation device that generates a diagnostic rule used for a diagnosis are communicably connected;
said first diagnostic device comprises a first diagnostic unit that senses an abnormal condition of a diagnostic object based on diagnostic object data measured on the diagnostic object; and a detailed diagnosis request unit that sends diagnostic request data, which includes diagnostic object data in a fixed period including a point in time at which an abnormal condition was sensed by said first diagnostic unit, to said second diagnostic device, receives a diagnostic result thereof, and outputs the diagnostic result from the output device;
said second diagnostic device comprises: a diagnostic rule storage unit that stores a diagnostic rule; a second diagnostic unit that diagnoses the diagnostic object by applying the diagnostic rule to the diagnostic request data received from said first diagnostic device; a diagnostic result response unit that sends a diagnostic result of the diagnostic request data to said first diagnostic device that is a diagnosis requesting device; a diagnostic case data sending unit that sends diagnostic case data, which includes the diagnostic object data in the diagnostic request data and a diagnostic result thereof, to said diagnostic rule generation device; and a diagnostic rule update unit that updates said diagnostic rule storage unit with the diagnostic rule received from said diagnostic rule generation device; and said diagnostic rule generation device comprises: a diagnostic rule generation unit that generates a diagnostic rule based on the diagnostic case data received from said second diagnostic device; and a diagnostic rule sending unit that sends the diagnostic rule, generated by said diagnostic rule generation unit, to said second diagnostic device.

5. The diagnostic system as defined by claim 1, wherein a plurality of first diagnostic devices, each of which senses an abnormal condition of a diagnostic object, are communicably connected to a second diagnostic device that diagnoses more in detail a state of the diagnostic object in which an abnormal condition was detected by said first diagnostic device and, at the same time, generates a diagnostic rule used for a diagnosis, said first diagnostic device comprises: a first diagnostic unit that senses an abnormal condition of a diagnostic object based on diagnostic object data measured on the diagnostic object; and a detailed diagnosis request unit that sends diagnostic request data, which includes diagnostic object data in a fixed period including a point in time at which an abnormal condition was sensed by said first diagnostic unit, to said second diagnostic device, receives a diagnostic result thereof, and outputs the diagnostic result from an output device, said second diagnostic device comprises: a diagnostic rule storage unit that stores a diagnostic rule; a second diagnostic unit that diagnoses the diagnostic object by applying the diagnostic rule to the diagnostic request data received from said first diagnostic device; a diagnostic result response unit that sends a diagnostic result of the diagnostic request data to said first diagnostic device that is a diagnosis requesting device; a diagnostic rule generation unit that generates a diagnostic rule based on diagnostic case data which includes the diagnostic object data in the diagnostic request data and a diagnostic result thereof; and a diagnostic rule update unit that updates said diagnostic rule storage unit with the diagnostic rule generated by said diagnostic rule generation device.

6. A diagnostic method for use in a diagnostic system in which a plurality of diagnostic devices, each of which diagnoses a diagnostic object, and a diagnostic rule generation device, which generates a diagnostic rule used for a diagnosis, are communicably connected, said diagnostic method comprising:

a diagnostic step, performed by diagnostic unit of said diagnostic device, that diagnoses a diagnostic object by applying a diagnostic rule, stored in a diagnostic rule storage unit, to diagnostic object data measured on the diagnostic object, and outputs a diagnostic result thereof from an output device;

a diagnostic case data sending step, performed by diagnostic case data sending means of said diagnostic device, that sends diagnostic case data, which includes the diagnostic object data and the diagnostic result, to said diagnostic rule generation device;

a diagnostic rule update step, performed by diagnostic rule update means of said diagnostic device, that updates said diagnostic rule storage unit with a diagnostic rule received from said diagnostic rule generation device;

a diagnostic case data reception step, performed by diagnostic case data reception means of said diagnostic rule generation device, that stores the diagnostic case data, received from said plurality of diagnostic devices, in diagnostic case data storage means;

a diagnostic rule generation step, performed by diagnostic rule generation means of said diagnostic rule generation device, that generates a diagnostic rule based on the diagnostic case data stored in said diagnostic case data storage means;

by diagnostic rule sending means of said diagnostic rule generation device, a first diagnostic rule generation step that generates a diagnostic rule based on the diagnostic case data and a first diagnostic rule sending step that sends the diagnostic rule, generated by said first diagnostic rule generation step, to said diagnostic rule generation device; and by said diagnostic rule generation device, a second diagnostic rule generation step that generates an integrated diagnostic rule from a plurality of diagnostic rules received from said plurality of diagnostic devices and a second diagnostic rule sending step that sends the diagnostic rule, generated by said second diagnostic rule generation step, to said diagnostic devices.

7. The diagnostic method as defined by claim 6, further comprising:

an abnormal-time estimation step, performed by abnormal-time estimation means of said diagnostic device, that detects if the diagnostic object data is data at a time series change point or an outlier of a data distribution; and a diagnostic case data sending step, performed by diagnostic case data sending means of said diagnostic device, that sends the diagnostic case data, which includes the diagnostic object data in a fixed period including a point in time at which a time series change point or an outlier of a data distribution was detected by said abnormal-time estimation means and a diagnostic result thereof, to said diagnostic rule generation device.

8. The diagnostic method as defined by claim 6, further comprising:

a diagnostic step, performed by diagnostic means of said diagnostic device, that diagnoses a diagnostic object by applying a diagnostic rule, stored in first diagnostic rule storage means, to diagnostic object data measured on the diagnostic object, and outputs a diagnostic result thereof from the output device;

a diagnostic rule generation step, performed by diagnostic rule generation means of said diagnostic device, that generates a diagnostic rule based on diagnostic case data which includes the diagnostic object data and the diagnostic result;

a diagnostic rule sending step, performed by diagnostic rule sending means of said diagnostic device, that sends the diagnostic rule, generated by said diagnostic rule generation means, to said diagnostic rule generation device;

a diagnostic rule reception step, performed by diagnostic rule reception means of said diagnostic rule generation device, that stores the diagnostic rule, received from said plurality of diagnostic devices, in second diagnostic rule storage means; and a diagnostic rule generation step, performed by diagnostic rule generation means of said diagnostic rule generation device, that generates an integrated diagnostic rule from the plurality of diagnostic rules stored in said second diagnostic rule storage means.

9. The diagnostic method as defined by claim 6 and for use in a diagnostic system in which a plurality of first diagnostic devices each of which senses an abnormal condition of a diagnostic object, a second diagnostic device that diagnoses more in detail a state of the diagnostic object in which an abnormal condition was detected by said first diagnostic device, and a diagnostic rule generation device that generates a diagnostic rule used for a diagnosis are communicably connected, said diagnostic method further comprising:
- a diagnostic step, performed by diagnostic means of said first diagnostic device, that senses an abnormal condition of a diagnostic object based on diagnostic object data measured on the diagnostic object;
- a detailed diagnosis request step, performed by detailed diagnosis request means of said first diagnostic device, that sends diagnostic request data, which includes diagnostic object data in a fixed period including a point in time at which an abnormal condition was sensed by said diagnostic means, to said second diagnostic device, receives a diagnostic result thereof, and outputs the diagnostic result from the output device;
- a diagnostic step, performed by diagnostic means of said second diagnostic device, that diagnoses the diagnostic object by applying a diagnostic rule, stored in a diagnostic rule storage unit, to the diagnostic request data received from said first diagnostic device;
- a diagnostic result response step, performed by a diagnostic result response unit of said second diagnostic device, that sends a diagnostic result of the diagnostic request data to said first diagnostic device that is a diagnosis requesting device;
- a diagnostic case data sending step, performed by a diagnostic case data sending unit of said second diagnostic device, that sends diagnostic case data, which includes the diagnostic case data in the diagnostic request data and a diagnostic result thereof, to said diagnostic rule generation device;
- a diagnostic rule update step, performed by a diagnostic rule update unit of said second diagnostic device, that updates said diagnostic rule storage unit with the diagnostic rule received from said diagnostic rule generation device;
- a diagnostic case data reception step, performed by a diagnostic case data reception unit of said diagnostic rule generation device, that stores the diagnostic case data, received from said second diagnostic device, in diagnostic case data storage unit;
- a diagnostic rule generation step, performed by a diagnostic rule generation unit of said diagnostic rule generation device, that generates a diagnostic rule based on the diagnostic case data stored in said diagnostic case data storage unit; and
- a diagnostic rule sending step, performed by diagnostic rule sending unit of said diagnostic rule generation device, that sends the diagnostic rule, generated by said diagnostic rule generation unit, to said second diagnostic device.

10. The diagnostic method as defined by claim 6 and for use in a diagnostic system in which a plurality of first diagnostic devices each of which senses an abnormal condition of a diagnostic object is communicably connected to a second diagnostic device that diagnoses more in detail a state of the diagnostic object in which an abnormal condition was detected by said first diagnostic device and, at the same time, generates a diagnostic rule used for a diagnosis, said diagnostic method further comprising:
- a diagnostic step, performed by a diagnostic unit of said first diagnostic device, that senses an abnormal condition of a diagnostic object based on diagnostic object data measured on the diagnostic object;
- a detailed diagnosis request step, performed by a detailed diagnosis request unit of said first diagnostic device, that sends diagnostic request data, which includes diagnostic object data in a fixed period including a point in time at which an abnormal condition was sensed by said diagnostic unit, to said second diagnostic device, receives a diagnostic result thereof, and outputs the diagnostic result from the output device;
- a diagnostic step, performed by a diagnostic unit of said second diagnostic device, that diagnoses the diagnostic object by applying a diagnostic rule, stored in diagnostic rule storage unit, to the diagnostic request data received from said first diagnostic device;
- a diagnostic result response step, performed by a diagnostic result response unit of said second diagnostic device, that sends a diagnostic result of the diagnostic request data to said first diagnostic device that is a diagnosis requesting device;
- a diagnostic rule generation step, performed by a diagnostic rule generation unit of said second diagnostic device, that generates a diagnostic rule based on diagnostic case data which includes the diagnostic object data in the diagnostic request data and a diagnostic result thereof; and
- a diagnostic rule update step, performed by a diagnostic rule update unit of said second diagnostic device, that updates said diagnostic rule storage unit with the diagnostic rule generated by said diagnostic rule generation device.

11. A diagnostic rule generation device that is communicably connected to a plurality of diagnostic devices each of which diagnoses a diagnostic object by applying a diagnostic rule to diagnostic object data measured on the diagnostic object,
said diagnostic rule generation device comprising:
- a diagnostic case data reception unit that receives diagnostic case data, which includes the diagnostic object data and a diagnostic result thereof, from said plurality of diagnostic devices;
- a diagnostic rule generation unit that generates a diagnostic rule based on the diagnostic case data received from said plurality of diagnostic devices; and
- a diagnostic rule sending unit that sends the diagnostic rule, generated by said diagnostic rule generation unit, to said diagnostic devices.

12. The diagnostic rule generation device as defined by claim 11 wherein said diagnostic rule generation device is communicably connected to a plurality of diagnostic devices each of which generates a diagnostic rule based on diagnostic case data that includes the diagnostic object data and a diagnostic result thereof, said diagnostic rule generation device further comprising:
- a diagnostic rule reception unit that receives the generated diagnostic rules from said plurality of diagnostic devices;
- a diagnostic rule generation unit that generates an integrated diagnostic rule from the plurality of diagnostic rules received from said plurality of diagnostic devices; and
- a diagnostic rule sending unit that sends the diagnostic rule, generated by said diagnostic rule generation unit, to said diagnostic devices.

13. The diagnostic rule generation device as defined by claim 11, wherein said diagnostic rule generation device is communicably connected to a detailed diagnostic device that, based on a diagnostic request from the plurality of diagnostic devices each of which senses an abnormal condition of a diagnostic object, diagnoses more in detail the diagnostic object data on the diagnostic object, in which an abnormal condition was detected by said diagnostic device, based on a diagnostic rule, said diagnostic rule generation device further comprising:
  a diagnostic case data reception unit that receives diagnostic case data, which includes the diagnostic object data and a diagnostic result thereof, from said detailed diagnostic device;
  a diagnostic rule generation unit that generates a diagnostic rule based on the diagnostic case data received from said detailed diagnostic device; and
  a diagnostic rule sending unit that sends the diagnostic rule, generated by the diagnostic rule generation unit, to said detailed diagnostic device.

14. A detailed diagnostic device that receives a diagnostic request from a plurality of diagnostic devices, each of which senses an abnormal condition of a diagnostic object, and diagnoses more in detail diagnostic object data on the diagnostic object, in which an abnormal condition was sensed by said diagnostic device, based on a diagnostic rule, said detailed diagnostic device comprising:
  a diagnostic rule storage unit that stores a diagnostic rule;
  a diagnostic unit that diagnoses the diagnostic object by applying the diagnostic rule to the diagnostic object data in diagnostic request data received from said diagnostic device;
  a diagnostic result response unit that sends a diagnostic result of the diagnostic request data to said diagnostic device that is a requesting diagnostic device;
  a diagnostic rule generation unit that generates a diagnostic rule based on diagnostic case data which includes the diagnostic object data in the diagnostic request data and a diagnostic result thereof; and
  a diagnostic rule update unit that updates said diagnostic rule storage unit with the diagnostic rule generated by said diagnostic rule generation device.

15. A non-transitory medium storing a program causing a computer, which configures a diagnostic rule generation device communicably connected to a plurality of diagnostic devices each of which diagnoses a diagnostic object by applying a diagnostic rule to diagnostic object data measured on the diagnostic object, to function as:
  a diagnostic case data reception unit that receives diagnostic case data, which includes the diagnostic object data and a diagnostic result thereof, from said plurality of diagnostic devices;
  a diagnostic rule generation unit that generates a diagnostic rule based on the diagnostic case data received from said plurality of diagnostic devices; and
  a diagnostic rule sending unit that sends the diagnostic rule, generated by said diagnostic rule generation unit, to said diagnostic devices;
  said program causing said computer to perform:
  a first diagnostic rule generation step that generates a diagnostic rule based on the diagnostic case data, and a first diagnostic rule sending step that sends the diagnostic rule, generated by said first diagnostic rule generation step, to said diagnostic rule generation device; and
  by said diagnostic rule generation device, a second diagnostic rule generation step that generates an integrated diagnostic rule from a plurality of diagnostic rules received from said plurality of diagnostic devices, and a second diagnostic rule sending step that sends the diagnostic rule, generated by said second diagnostic rule generation step, to said diagnostic devices.

16. The non-transitory computer-readable storage medium as defined by claim 15, wherein the program further causes the computer, which configures the diagnostic rule generation device communicably connected to a plurality of diagnostic devices each of which generates a diagnostic rule based on diagnostic case data that includes the diagnostic object data and a diagnostic result thereof, to function as:
  a diagnostic rule reception unit that receives the generated diagnostic rules from said plurality of diagnostic devices;
  a diagnostic rule generation unit that generates an integrated diagnostic rule from the plurality of diagnostic rules received from said plurality of diagnostic devices; and
  a diagnostic rule sending unit that sends the diagnostic rule, generated by said diagnostic rule generation unit, to said diagnostic devices.

17. The non-transitory computer-readable storage medium as defined by claim 15, wherein the program further causes the computer, which configures the diagnostic rule generation device communicably connected to a detailed diagnostic device that, based on a diagnostic request from the plurality of diagnostic devices each of which senses an abnormal condition of a diagnostic object, diagnoses more in detail the diagnostic object data on the diagnostic object, in which an abnormal condition was detected by said diagnostic device, based on a diagnostic rule, to function as:
  a diagnostic case data reception unit that receives diagnostic case data, which includes the diagnostic object data and a diagnostic result thereof, from said detailed diagnostic device;
  diagnostic rule generation unit that generates a diagnostic rule based on the diagnostic case data received from said detailed diagnostic device; and
  a diagnostic rule sending unit that sends the diagnostic rule, generated by the diagnostic rule generation unit, to said detailed diagnostic device.

18. The non-transitory computer-readable storage medium as defined by claim 15, wherein the program further causes a computer, which configures a detailed diagnostic device that comprises a diagnostic rule storage unit which stores a diagnostic rule, receives a diagnostic request from a plurality of diagnostic devices each of which senses an abnormal condition of a diagnostic object, and diagnoses more in detail diagnostic object data on the diagnostic object, in which an abnormal condition was sensed by said diagnostic device, based on the diagnostic rule, to function as:
  a diagnostic unit that diagnoses the diagnostic object by applying the diagnostic rule to the diagnostic object data in diagnostic request data received from said diagnostic device;
  a diagnostic result response unit that sends a diagnostic result of the diagnostic request data to said diagnostic device that is a requesting diagnostic device;
  a diagnostic rule generation unit that generates a diagnostic rule based on diagnostic case data which includes the diagnostic object data in the diagnostic request data and a diagnostic result thereof; and
  a diagnostic rule update unit that updates said diagnostic rule storage unit with the diagnostic rule generated by said diagnostic rule generation device.

* * * * *